United States Patent
Elshafie et al.

(10) Patent No.: US 12,127,234 B2
(45) Date of Patent: Oct. 22, 2024

(54) PAYLOAD SIZE REDUCTION FOR REPORTING RESOURCE SENSING MEASUREMENTS

(71) Applicant: QUALCOMM Incorporated, San Diego, CA (US)

(72) Inventors: Ahmed Elshafie, San Diego, CA (US); Tugcan Aklas, La Jolla, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 17/512,065

(22) Filed: Oct. 27, 2021

(65) Prior Publication Data

US 2023/0125285 A1 Apr. 27, 2023

(51) Int. Cl.
| | |
|---|---|
| *H04W 72/542* | (2023.01) |
| *H04W 24/10* | (2009.01) |
| *H04W 28/26* | (2009.01) |
| *H04W 72/02* | (2009.01) |
| *H04W 72/20* | (2023.01) |
| *H04W 76/14* | (2018.01) |
| *H04W 88/04* | (2009.01) |

(52) U.S. Cl.
CPC ......... *H04W 72/542* (2023.01); *H04W 28/26* (2013.01); *H04W 72/02* (2013.01); *H04W 72/20* (2023.01)

(58) Field of Classification Search
CPC ... H04W 72/542; H04W 72/20; H04W 28/26; H04W 72/02

USPC .......................................................... 370/329
See application file for complete search history.

(56) References Cited

U.S. PATENT DOCUMENTS

| | | | |
|---|---|---|---|
| 2013/0322276 A1 | 12/2013 | Pelletier et al. | |
| 2016/0242131 A1* | 8/2016 | Popovic | H04L 27/2636 |
| 2020/0153574 A1* | 5/2020 | Shin | H04W 4/40 |
| 2021/0153213 A1 | 5/2021 | Wang et al. | |
| 2022/0174655 A1* | 6/2022 | Tsai | H04W 72/20 |
| 2022/0183017 A1* | 6/2022 | Wu | H04B 17/309 |

(Continued)

OTHER PUBLICATIONS

International Search Report and Written Opinion—PCT/US2022/041110—ISA/EPO—Feb. 14, 2023 (2103482WO).

(Continued)

*Primary Examiner* — Xuan Lu
(74) *Attorney, Agent, or Firm* — Holland & Hart / Qualcomm

(57) ABSTRACT

Methods, systems, and devices for wireless communications are described. Generally, a user equipment (UE) may sense and report resource availability using a reporting pattern to manage a payload size of a reporting message. A sensing pattern may indicate a pattern of resources of a sidelink channel that is being reported in the reporting message (e.g., and one or more sidelink channel resources not being reported), and a resolution of resource availability statuses reported for a first subset of resources of a sidelink channel. A base station or another UE may indicate which reporting pattern (e.g., from a set of configured patterns) that a UE is to use for sensing and generating the sensing report. The UE may autonomously select the reporting pattern, and may transmit an indication of the pattern to the receiving UE.

27 Claims, 19 Drawing Sheets

(56) References Cited

U.S. PATENT DOCUMENTS

| | | | |
|---|---|---|---|
| 2022/0303030 A1* | 9/2022 | Minotani | H04B 7/0626 |
| 2022/0329301 A1* | 10/2022 | Shin | H04L 1/0003 |
| 2023/0050521 A1* | 2/2023 | Manolakos | H04L 5/0051 |
| 2023/0109558 A1* | 4/2023 | Hui | H04L 5/0094 |
| | | | 370/329 |

OTHER PUBLICATIONS

Partial International Search Report—PCT/US2022/041110—ISA/EPO—Nov. 29, 2022 (2103482WO).

* cited by examiner

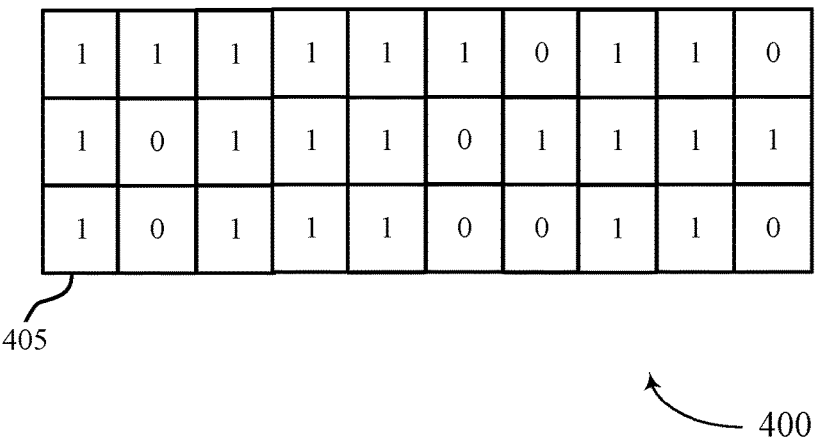
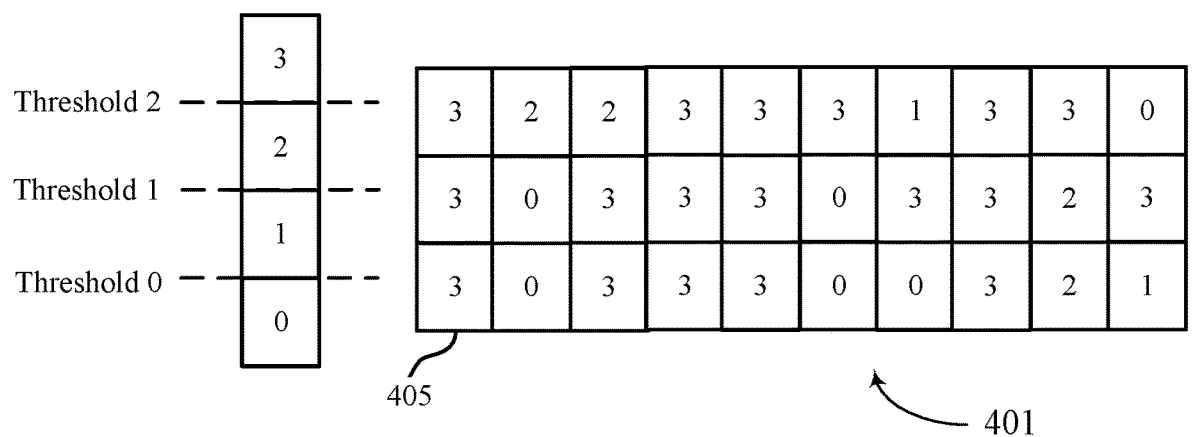
FIG. 4

PAYLOAD SIZE REDUCTION FOR REPORTING RESOURCE SENSING MEASUREMENTS

FIELD OF TECHNOLOGY

The following relates to wireless communications, including payload size reduction for reporting resource sensing measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, one or more UEs may communicate with each other via a sidelink.

SUMMARY

The described techniques relate to improved methods, systems, devices, and apparatuses that support payload size reduction for reporting resource sensing measurements. Generally, a UE may sense and report resource availability using a reporting pattern to manage a payload size of a reporting message. In some examples, multiple reporting UEs may report which sensing pattern the respective UEs have selected to a central node (e.g., a receiving UE). In some cases, the sensing pattern may indicate a pattern of resources of a sidelink channel that is being reported in the reporting message (e.g., and one or more sidelink channel resources not being reported), and a resolution of resource availability statuses reported for a first subset of resources of a sidelink channel. In some examples, a base station or another UE may indicate which reporting pattern (e.g., from a set of configured patterns) that a UE is to use for sensing and generating the sensing report. In some examples, the UE may autonomously select the reporting pattern, and may transmit an indication of the pattern to the receiving UE. In some examples, a UE may measure and report auto-correlation, auto-covariance, cross-covariance, or other statistics for each resource. From this statistical information, and at least one measurement and report from another UE (e.g., upon receiving the sensing report from a transmitting UE), a receiving UE may generate a prediction of a full report (e.g., may combine one or more received reports, one or more measured statistics, or the like, to generate a full report of a set of resources).

A method for wireless communications at a first user equipment (UE) is described. The method may include measuring a first subset of resources of a sidelink channel to generate a set of multiple channel quality measurements of the sidelink channel and transmitting, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel.

An apparatus for wireless communications at a first UE is described. The apparatus may include a processor, memory coupled with the processor, and instructions stored in the memory. The instructions may be executable by the processor to cause the apparatus to measure a first subset of resources of a sidelink channel to generate a set of multiple channel quality measurements of the sidelink channel and transmit, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel.

Another apparatus for wireless communications at a first UE is described. The apparatus may include means for measuring a first subset of resources of a sidelink channel to generate a set of multiple channel quality measurements of the sidelink channel and means for transmitting, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel.

A non-transitory computer-readable medium storing code for wireless communications at a first UE is described. The code may include instructions executable by a processor to measure a first subset of resources of a sidelink channel to generate a set of multiple channel quality measurements of the sidelink channel and transmit, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel.

In some examples of the method, apparatuses, and non-transitory computer-readable medium described herein, the resource reporting pattern indicates a first resolution may be used to report each of the first set of metric values and a second resolution may be used to report each of a second set of metric values for the second subset of resources.

In some examples of the method, apparatuses, and non-transitory computer-readable medium described herein, the resource reporting pattern indicates that metric values for the second subset of resources may be not to be reported in the reporting message.

In some examples of the method, apparatuses, and non-transitory computer-readable medium described herein, each resource reporting pattern of a set of resource reporting patterns indicates a set of quantization levels.

In some examples of the method, apparatuses, and non-transitory computer-readable medium described herein, each metric value, of the first set of metric values, represents at least one of a channel quality metric, whether a resource of the sidelink channel may be available, or a level of availability of a resource of the sidelink channel.

Some examples of the method, apparatuses, and non-transitory computer-readable medium described herein may further include operations, features, means, or instructions for receiving, from a base station or another UE, control signaling indicating to use the resource reporting pattern.

Some examples of the method, apparatuses, and non-transitory computer-readable medium described herein may further include operations, features, means, or instructions for receiving, from a base station or another UE, control signaling including an indication of a set of resource reporting patterns and selecting, the resource reporting pattern from the set of resource reporting patterns.

Some examples of the method, apparatuses, and non-transitory computer-readable medium described herein may further include operations, features, means, or instructions for transmitting the reporting message includes transmitting the reporting message including a second set of metric values for the second subset of resources and each of the first set of metric values indicated in the reporting message may have a first number of bits that may be greater than a second number of bits used to report each of the second set of metric values.

Some examples of the method, apparatuses, and non-transitory computer-readable medium described herein may further include operations, features, means, or instructions for transmitting the reporting message indicating the resource reporting message and transmitting, to the second UE, the reporting message or a control message indicating the resource reporting pattern.

In some examples of the method, apparatuses, and non-transitory computer-readable medium described herein, the reporting message includes a sidelink control information message.

In some examples of the method, apparatuses, and non-transitory computer-readable medium described herein, transmitting the reporting message may include operations, features, means, or instructions for transmitting the reporting message including a second set of metric values for the second subset of resources, where each of the first set of metric values may be selected from a first number of quantization levels that may be greater than a second number of quantization levels for each of the second set of metric values.

Some examples of the method, apparatuses, and non-transitory computer-readable medium described herein may further include operations, features, means, or instructions for quantizing a first channel quality measurement of the set of multiple channel quality measurements to a first quantization level of a set of multiple quantization levels for a first resource of the first subset of resources, where the reporting message indicates the first quantization level for the first resource.

Some examples of the method, apparatuses, and non-transitory computer-readable medium described herein may further include operations, features, means, or instructions for refraining from measuring, for a sensing window, the second subset of resources of the sidelink channel that differs from the first subset of resources.

A method for wireless communications at a second UE is described. The method may include receiving, from a first UE, a reporting message indicating a first set of metric values for a first subset of resources of a sidelink channel according to a resource reporting pattern, transmitting a sidelink resource reservation message reserving one or more sidelink resources of the first subset of resources based on the reporting message, and transmitting a sidelink message on the reserved one or more sidelink resources of the first subset of resources.

An apparatus for wireless communications at a second UE is described. The apparatus may include a processor, memory coupled with the processor, and instructions stored in the memory. The instructions may be executable by the processor to cause the apparatus to receive, from a first UE, a reporting message indicating a first set of metric values for a first subset of resources of a sidelink channel according to a resource reporting pattern, transmit a sidelink resource reservation message reserving one or more sidelink resources of the first subset of resources based on the reporting message, and transmit a sidelink message on the reserved one or more sidelink resources of the first subset of resources.

Another apparatus for wireless communications at a second UE is described. The apparatus may include means for receiving, from a first UE, a reporting message indicating a first set of metric values for a first subset of resources of a sidelink channel according to a resource reporting pattern, means for transmitting a sidelink resource reservation message reserving one or more sidelink resources of the first subset of resources based on the reporting message, and means for transmitting a sidelink message on the reserved one or more sidelink resources of the first subset of resources.

A non-transitory computer-readable medium storing code for wireless communications at a second UE is described. The code may include instructions executable by a processor to receive, from a first UE, a reporting message indicating a first set of metric values for a first subset of resources of a sidelink channel according to a resource reporting pattern, transmit a sidelink resource reservation message reserving one or more sidelink resources of the first subset of resources based on the reporting message, and transmit a sidelink message on the reserved one or more sidelink resources of the first subset of resources.

Some examples of the method, apparatuses, and non-transitory computer-readable medium described herein may further include operations, features, means, or instructions for transmitting, to the first UE, control signaling indicating an instruction to use the resource reporting pattern of a set of multiple different resource reporting patterns.

Some examples of the method, apparatuses, and non-transitory computer-readable medium described herein may further include operations, features, means, or instructions for receiving, from a base station or another UE, control signaling including an indication of a set of resource reporting patterns including the resource reporting pattern.

In some examples of the method, apparatuses, and non-transitory computer-readable medium described herein, receiving the reporting message may include operations, features, means, or instructions for receiving the reporting message including a second set of metric values for a second subset of resources of the sidelink channel according to the resource reporting pattern, where each of the first set of metric values may be selected from a first number of quantization levels that may be greater than a second number of quantization levels for each of the second set of metric values.

Some examples of the method, apparatuses, and non-transitory computer-readable medium described herein may further include operations, features, means, or instructions for receiving, from the first UE, control signaling including an indication of the resource reporting pattern.

In some examples of the method, apparatuses, and non-transitory computer-readable medium described herein, the control signaling includes a sidelink control information message.

In some examples of the method, apparatuses, and non-transitory computer-readable medium described herein, the resource reporting pattern includes an indication of a set of quantization levels.

Some examples of the method, apparatuses, and non-transitory computer-readable medium described herein may further include operations, features, means, or instructions for receiving, from a third UE, a second reporting message indicating a second set of metric values for a second subset of resources of the sidelink channel according to a second resource reporting pattern and determining a metric value for one or more sidelink resource of the sidelink channel based on the first set of metric values and the second set of metric values, where transmitting the sidelink resource reservation message may be based on the determining.

Some examples of the method, apparatuses, and non-transitory computer-readable medium described herein may further include operations, features, means, or instructions for determining the metric value may be based on performing an auto correlation procedure, a cross-correlation procedure, or both, based on the first set of metric values and the second set of metric values.

In some examples of the method, apparatuses, and non-transitory computer-readable medium described herein, the resource reporting pattern indicates a first resolution may be used to report each of the first set of metric values and a second resolution may be used to report each of a second set of metric values for a second subset of resources.

In some examples of the method, apparatuses, and non-transitory computer-readable medium described herein, the resource reporting pattern indicates that metric values for a second subset of resources may be not to be reported in the reporting message.

In some examples of the method, apparatuses, and non-transitory computer-readable medium described herein, each metric value, of the first set of metric values, represents at least one of a channel quality metric, whether a resource of the sidelink channel may be available, or a level of availability of a resource of the sidelink channel.

BRIEF DESCRIPTION OF THE DRAWINGS

FIG. 4 illustrates examples of availability reports that supports payload size reduction for reporting resource sensing measurements in accordance with aspects of the present disclosure.

DETAILED DESCRIPTION

Figure 1:
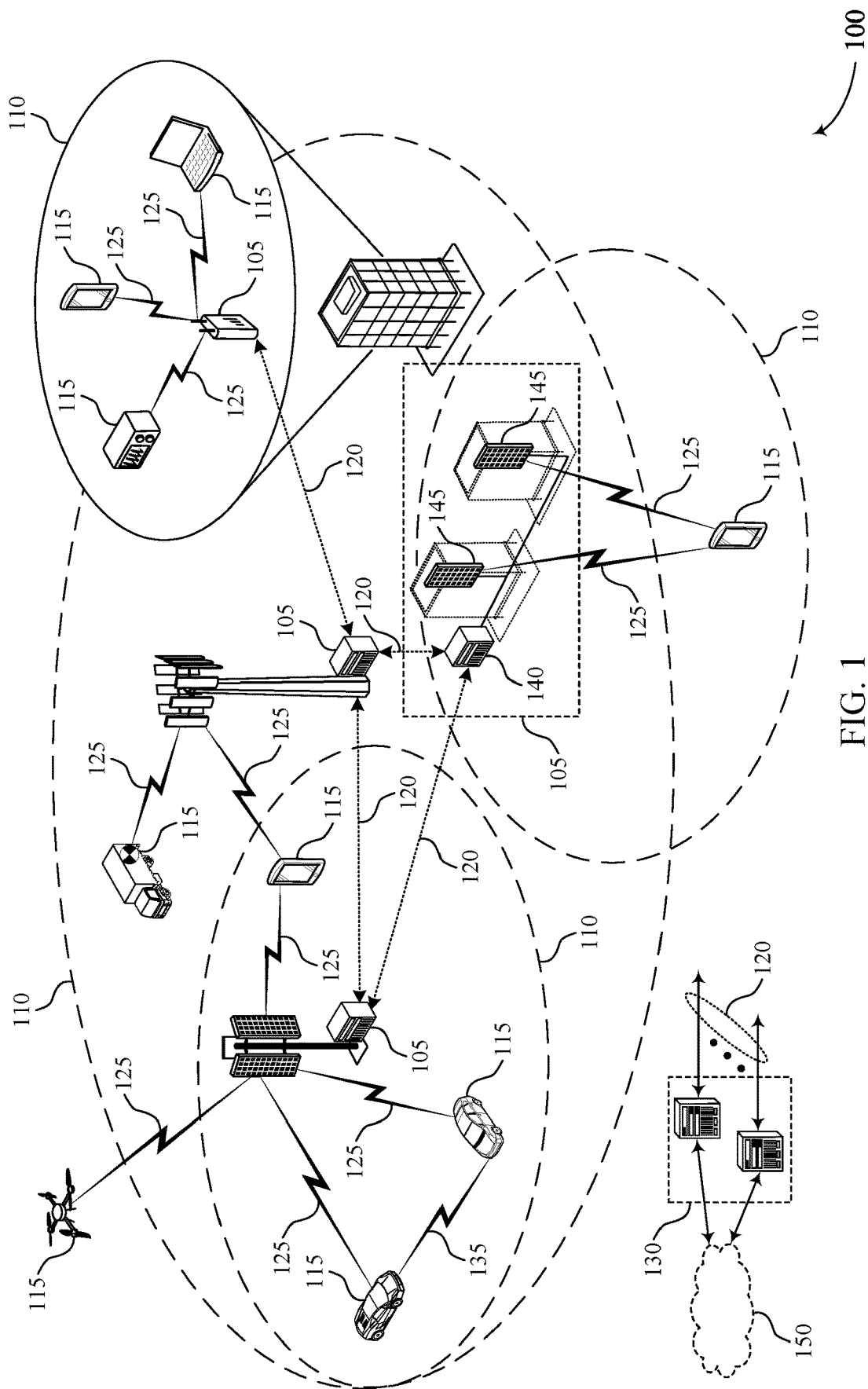
FIG. 1 illustrates an example of a wireless communications system that supports payload size reduction for reporting resource sensing measurements in accordance with aspects of the present disclosure.

Some wireless networks (e.g., 5G networks) may support sidelink communication links between user equipments (UEs). UEs may compete for resources in a sidelink network. Additionally, some sidelink networks may operate using half-duplex communication. Thus, when a UE is transmitting information over the sidelink channel, the UE may not be able to receive information over other sidelink channels. Such conditions (e.g., the competing for resources and the half-duplex communications) may result in inefficiencies in the allocation of communication resources and collisions between communications of different UEs. In some examples, UEs may perform sensing to identify available or non-available resources. The UEs may communicate information about future available or non-available resources (e.g., if a resource is available, not available, preferred, non-preferred, or may be involved in a collision between two or more transmissions). Such information may be provided in a coordination message over a sidelink channel. However, such a coordination message may have a large payload size, especially in cases when multiple UEs are coordinating. Such large payload sizes may result in decreased throughput, increased power expenditures, and increased system latency. Further, a single-bit report (e.g., using a single bit indication for each of a set of future resources) may not provide enough information for efficient use of available resources. But a full resolution report for each of the future resources may not be efficient (e.g., may use too much signaling overhead). Decreased payload size, and improved quantization of coordination reporting may result in improved throughput, decreased collision, and more efficient use of available sidelink resources.

A UE may select a reporting pattern for sensing reporting from a set of reporting patterns to manage a payload size of a reporting message. In some examples, multiple reporting UEs may report which sensing pattern the respective UEs has selected to a central node (e.g., a receiving UE). In some cases, the sensing pattern may indicate a pattern of resources of a sidelink channel that is being reported in the reporting message (e.g., and one or more sidelink channel resources not being reported), and a resolution of resource availability statuses reported for a first subset of resources of a sidelink channel. In some examples, a base station or another UE may indicate which reporting pattern (e.g., from a set of configured patterns) that a UE is to use for sensing and generating the sensing report. In some examples, the UE may autonomously select the reporting pattern, and may transmit an indication of the pattern to the receiving UE. In some examples, a UE may measure and report auto-correlation, auto-covariance, cross-covariance, or other statistics for each resource. From this statistical information, and at least one measurement and report from another UE (e.g., upon receiving the sensing report from a transmitting UE), a receiving UE may generate a prediction of a full report (e.g., may combine one or more received reports, one or more measured statistics, or the like, to generate a full report of a set of resources).

Aspects of the disclosure are initially described in the context of wireless communications systems. Aspects of the disclosure are further illustrated by and described with reference to wireless communications systems, coordination procedures, availability reports, availability reporting procedures, report combination procedures, and process flows. Aspects of the disclosure are further illustrated by and described with reference to apparatus diagrams, system diagrams, and flowcharts that relate to payload size reduction for reporting resource sensing measurements.

FIG. 1 illustrates an example of a wireless communications system 100 that supports payload size reduction for reporting resource sensing measurements in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or another radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Generally, a UE 115 may sense and report resource availability using a reporting pattern to manage a payload size of a reporting message. In some examples, multiple reporting UEs 115 may report which sensing pattern the respective UEs 115 have selected to a central node (e.g., a receiving UE 115). In some cases, the sensing pattern may indicate a pattern of resources of a sidelink channel that is being reported in the reporting message (e.g., and one or more sidelink channel resources not being reported), and a resolution of resource availability statuses reported for a first subset of resources of a sidelink channel. In some examples, a base station 105 may or another UE 115 may indicate which reporting pattern (e.g., from a set of configured patterns) that a UE is to use for sensing and generating the sensing report. In some examples, the UE 115 may autonomously select the reporting pattern, and may transmit an indication of the pattern to the receiving UE 115. In some examples, a UE 115 may measure and report auto-correlation, auto-covariance, cross-covariance, or other statistics for each resource. From this statistical information, and at least one measurement and report from another UE 115 (e.g., upon receiving the sensing report from a transmitting UE 115), a receiving UE 115 may generate a prediction of a full report (e.g., may combine one or more received reports, one or more measured statistics, or the like, to generate a full report of a set of resources).

Figure 2:
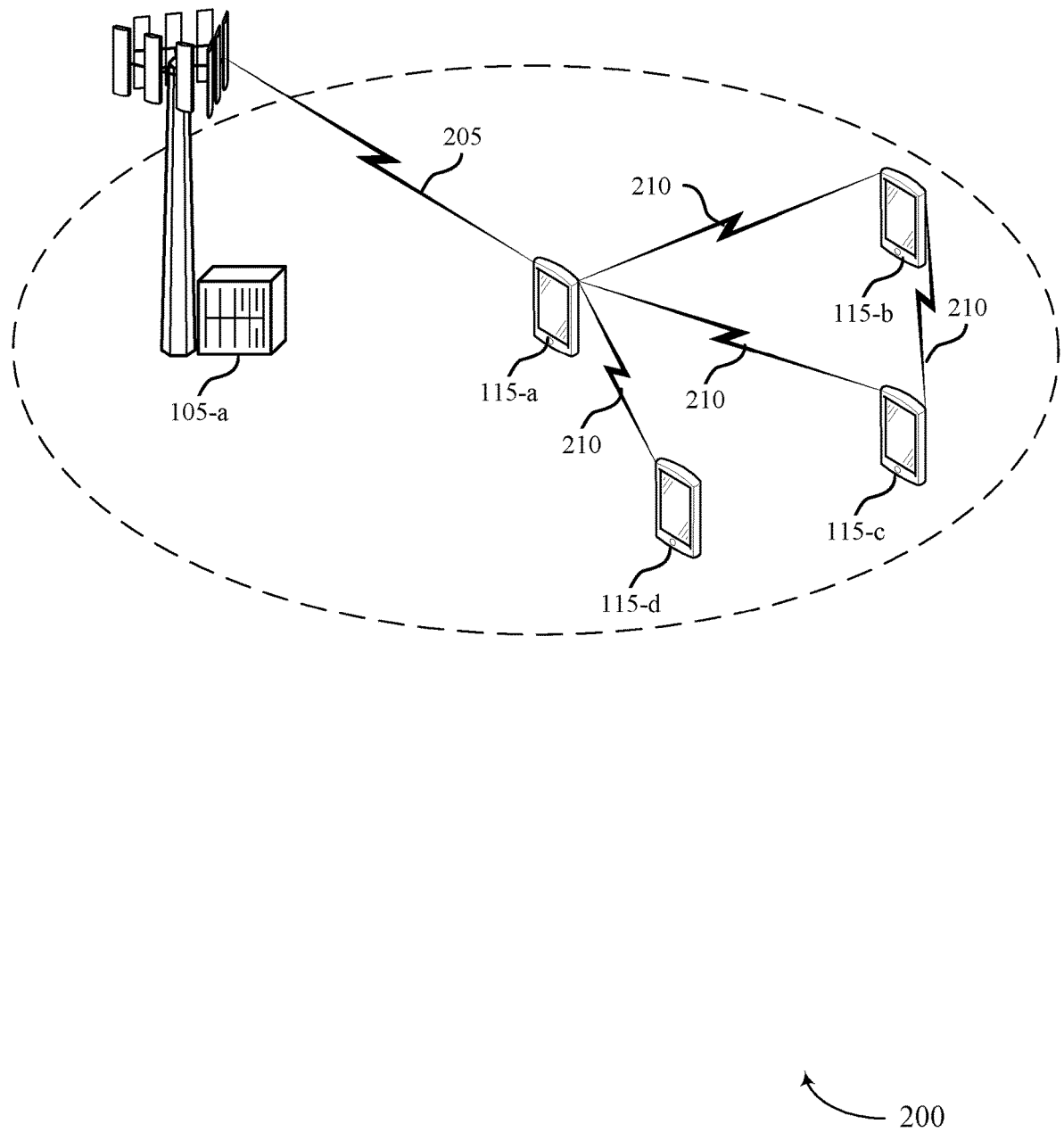
FIG. 2 illustrates an example of a wireless communications system that supports payload size reduction for reporting resource sensing measurements in accordance with aspects of the present disclosure.

FIG. 2 illustrates an example of a wireless communications system 200 that supports payload size reduction for reporting resource sensing measurements in accordance with aspects of the present disclosure. The wireless communications system 200 may include a base station 105-a, a UE 115-a, a UE 115-b, and a UE 115-c, which may be examples of corresponding devices described with reference to FIG. 1. In some examples, the base station 105-a may communicate with one or more UEs 115 via a bidirectional communication link 205 (e.g., via a Uu interface). In some examples, the UEs 115 may communicate with each other via a sidelink 210 (e.g., a PC5 interface).

In some examples, one or more UEs 115 may coordinate with each other to more efficiently allocate sidelink resources. For example, UEs 115 may compete for sidelink resources on a sidelink 210. Additionally, some sidelink networks may operate using half-duplex communication. Thus, when a UE 115 is transmitting information over the sidelink channel, the UE may not be able to receive information over other sidelink channels. Such conditions (e.g., the competing for resources and the half-duplex communications) may result in inefficiencies in the allocation of communication resources and collisions between communications of different UEs 115.

In some examples, UEs 115 may exchange information regarding the availability of future communication resources on sidelink 210 (e.g., if a resource is preferred, non-preferred, or may be involved in a collision between two or more transmissions) that is separate from scheduling messages and feedback signaling (e.g., acknowledgement (ACK) messages and negative acknowledgement (NACK) messages).

For example, the UE 115-a may be referred to as an assisting UE. The UE 115-a may perform resource sensing, as described in greater detail with reference to FIG. 3. The UE 115-a may identify an availability status (e.g., whether future sidelink resources are available, unavailable, preferred, non-preferred, etc.) for each resource of a set of future sidelink resources. The UE 115-a may then transmit a coordination message to one or more UEs 115 (e.g., UE 115-b). The coordination message may include indications of whether or not each sidelink resources from a set of candidate sidelink resources are available or not available. The UE 115-b may utilize the coordination message to select sidelink resources on which to transmit (e.g., to UE 115-c). The UE 115-b may avoid resources on which a collision would occur (e.g. resources that are already scheduled for a transmission, or experience interference above a threshold, or the like).

In some examples, one or more transmitting UEs 115 (e.g., UE 115-b) may be power-sensitive, and may not be able to afford sensing continuously on all resources. For instance, the UE 115-a in such examples ay be a smart watch or other wearable device, a headphone or ear bud, or the like. In such examples, a receiving UE (e.g., UE 115-a) may be more capable in terms of power (e.g., may be a smart phone, streaming device, V2X device, or the like), and may perform the sensing procedures.

The UE 115-a may report back resource availability information to the UE 115-b, and the UE 115-b may select available resources on which to communicate with the UE 115-a. In some examples, the UE 115-b may transmit a request for an coordination reports from the UE 115-a (e.g., as described in greater detail with reference to FIG. 3). In some examples, the receiving UE (e.g., the UE 115-a) may be a receiver side device of a unicast or groupcast communications group, or any other UE 115 that assists in communication of other UEs 115 on the sidelink 210. For instance, the UE 115-a may be a scheduling UE, or may receiving scheduling information from one or more UEs 115. In some examples, as described herein, a UE 115-b may also perform one or more measurements during a sensing window, to determine availability for one or more future sidelink resources. Upon receiving a report from the UE 115-a indicating availability of the same set of one or more future sidelink resources, the UE 115-b may more accurately and efficiently determine sidelink resource availability. That is, the UE 115-b may at any time have at least two different views or perspectives on resource availability in a reservation window due to different locations of UE 115-a and UE 115-b. For instance, UE 115-b may sense or have access to information regarding a first set of UEs 115, and the UE 115-a may similarly sense or have access to information regarding a second set of UEs 115, and the different information may or may not be the same).

In some examples, the UE 115-a may generate a reporting message (e.g., a coordination report) indicating which sidelink resources of a set of future resources are available for transmission for the UE 115-b. The UE 115-a may continuously sense sidelink resources during a measurement or sensing window. The UE 115-a may measure one or more metric values for reporting, such as interference signal levels. For instance, the UE 115-a may measure matric values such as a reference signal receive power (RSRP) from the UE 115-c (e.g., −92 dBm), and an RSRP from the UE 115-d (e.g., −102 dBm). In a last transmission from the UE 115-b, the UE 115-a may measure a target signal level (e.g., an RSRP of −90 dB). The UE 115-a may estimate an SIR for the UE 115-b and the UE 115-c (e.g., 2 dB) and an SIR for the UE 115-*b* and the UE 115-*d* (e.g., 12 dB). In such examples, the SIR for the UE 115-*b* and the UE 115-*d* may be large enough for reliable communications between the UE 115-*b* and the UE 115-*a*. The UE 115-*a* may indicate, in the coordination message, that the resources reserved by the UE 115-*d* are available to the UE 115-*b* for communications with the UE 115-*a*. In some examples, scheduling of communications may be based on whether the UE 115-*b* has more than one data stream with varying quality of service (QoS) requirements or transmissions with different MCS indices.

Thus, coordination messages may allow for more efficient utilization of available sidelink resources. Some resources may be available to more than one UE 115 depending on measured or estimated metric values, such as an SIR for various subsets of the UEs 115. Use of other sidelink resources may result in an increase in collisions, increased interference, increased system latency, and decreased user experience. Inter-UE coordination (e.g., exchanging coordination messages).

However, a single-bit report (e.g., using a single bit indicating that each resource of the set of future resources is either available or unavailable) may not provide enough information for efficient use of available resources. That is, some resources may experience higher levels of interference than others, but may still be available for some communications. But a full resolution report for each of the future resources may not be efficient (e.g., may result in a large increase in signaling overhead). Improved quantization of coordination reporting may be beneficial.

As described in greater detail with reference to FIGS. 3-4, a UE 115 may generate a report which contains soft resource availability information. In such examples, for each resource, the UE 115 may report a number (e.g., $2^N$) of different levels of availability by using N bits instead of one bit. For instance, a UE 115 may generate statistical modeling of sensing outcomes (e.g., may identify one or more measurement statistics), and may transmit values that are quantized based on the one or more measurement statistics. Measurement statistics may include one or more of mean and variance of sensing results (e.g., channel quality measurements such as signal to interference ratio (SIR)), autocorrelation of measurements or measurement statistics over time, auto-covariance, or the like.

Figure 3:
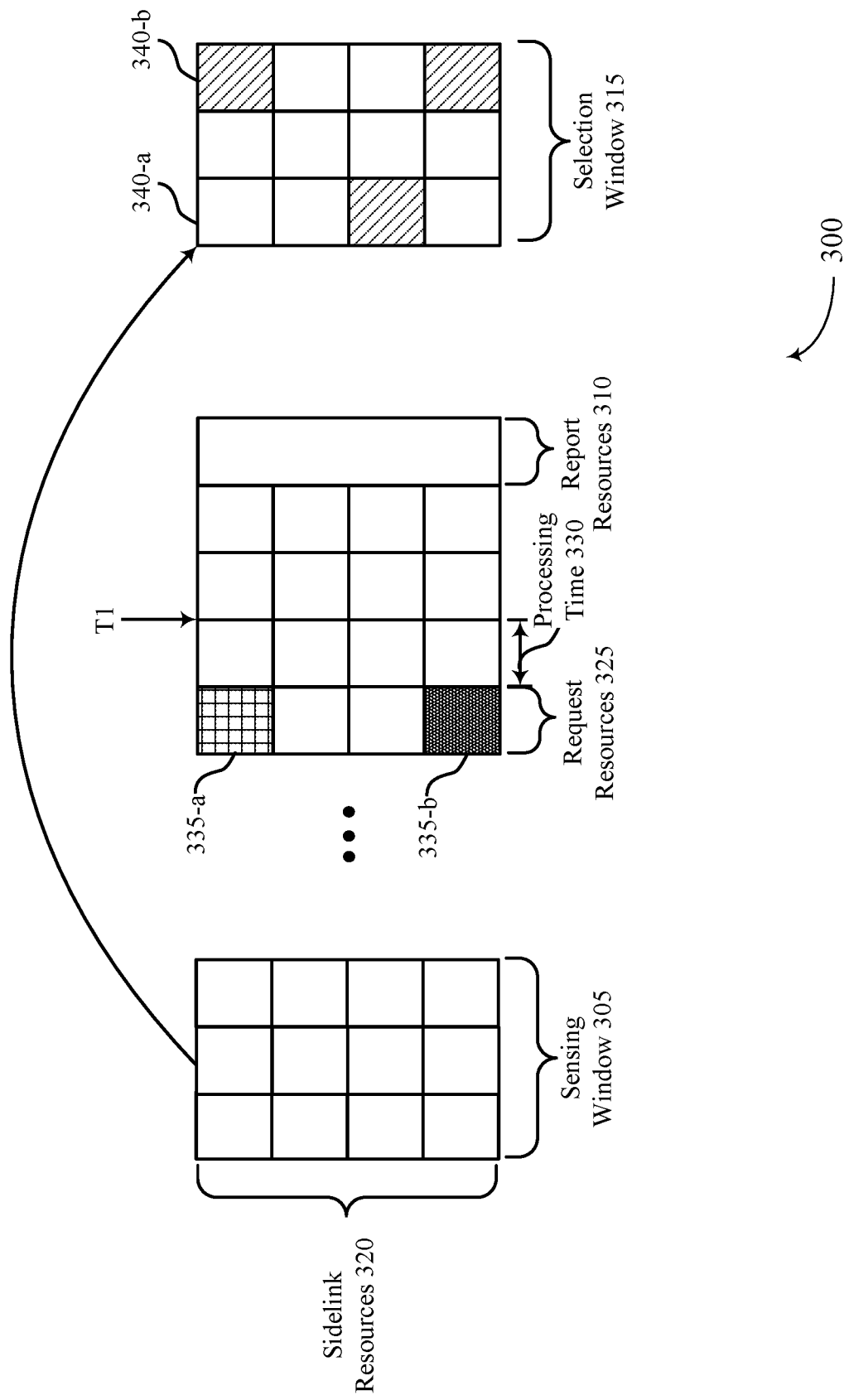
FIG. 3 illustrates an example of a coordination procedure that supports payload size reduction for reporting resource sensing measurements in accordance with aspects of the present disclosure.

FIG. 3 illustrates an example of a coordination procedure 300 that supports payload size reduction for reporting resource sensing measurements in accordance with aspects of the present disclosure. The coordination procedure 300 may be implemented by, or may implement aspects of, one or more wireless devices (e.g., UEs 115 or base stations 105), which may be corresponding devices described with reference to FIGS. 1-2.

In some examples, a helping UE 115 (e.g., the UE 115-*a*) may perform a coordination procedure 300. For instance, the helping UE 115 may perform sensing during sensing window 305, may report sensing results (e.g., in a coordination message) during report resources 310, and may indicate (e.g., in the coordination message) an availability status for resources in a selection window 315. In some examples, the helping UE 115 may initiate the coordination procedure 300 based on receiving a request from one or more other UEs 115 (e.g., a UE 115-*b* as described with reference to FIG. 2). The helping UE 115 may be instructed directly by a base station 105 (e.g., the base station 105-*b* as described with reference to FIG. 2) to perform the coordination procedure. In some examples, the helping UE 115 may continuously or periodically sense resources (e.g., during a sensing window 305) and may be triggered by one or more conditions or preconfigured to perform the coordination procedure 300. In some examples, the helping UE 115 may, based on locally available information, decide to transmit inter-UE coordination messages (e.g., without being triggered, instructed, or requested).

During the sensing window 305, the helping UE 115 may monitor sidelink resources 320, receive transmissions from one or more other UEs 115, receive or transmit scheduling requests from one or more other UEs 115, receive scheduling information from a base station 105, or receive one or more reference signals from one or more neighboring UEs 115. The UE 115 may perform measurements on received reference signals or sidelink data or control signaling, and may identify interference levels between various combinations of UEs 115 during resources of selection window 315. The helping UE 115 may identify resources of selection window 315 during which the helping UE 115 or other UEs 115 are scheduled for subsequent sidelink transmissions.

During request resources 325, the helping UE 115 may receive one or more requests from other UEs 115. For instance, the helping UE 115 may receive a first request 335-*a* from a first UE 115 and a second request 335-*b* from a second UE 115. Each of the first and second requests may trigger reporting of the results from sensing window 305 (e.g., transmission of a coordination message during report resources 310). After processing time 330, at time T1, the helping UE 115 may generate the coordination message based on having received the requests 335 during request resources 325. The helping UE 115 may transmit the coordination message (e.g., to the requesting UEs 115) during report resources 310.

The coordination message may include an indication of an availability status for each sidelink resources 340 in the selection window 315. The helping UE 115 may, for instance, indicate that the sidelink resource 340-*a* is available, but that the sidelink resource 340-*b* is unavailable for transmissions by one or more transmitting UEs 115. In some examples, the helping UE 115 may broadcast a coordination message. In some examples, the UE 115-*a* may transmit multiple coordination messages with UE-specific coordination information (e.g., resource availability status information) directly to individual UEs 115. Each coordination message may be different, indicating which sidelink resources during the selection widow 315 the transmitting UE is permitted to utilize.

In some examples (e.g., in mode 2 random access), a resource selection window may be chosen by a helping UE 115. In such examples, a gap between resource selection triggering time and an end of a resource selection window may be smaller than or equal to a packet delay budget (PDB) of a packet. A staring point of a selection window in such examples may be an offset after a selection is triggered. The value of the offset may be selected by the UE 115.

In some examples, the coordination message may include single-bit reports for each sidelink resource 340 in the selection window 315, as illustrated with reference to FIG. 4. However, a single-bit report (e.g., using a single bit indicating that each resource of the set of future resources is either available or unavailable) may not provide enough information for efficient use of available resources. That is, some resources may experience higher levels of interference than others, but may still be available for some communications. In some examples, as described in greater detail with reference to FIG. 4, the coordination message may include a multi-bit report for each sidelink resource 340 in the selection window. But a full resolution report for each of the sidelink resources 340 may not be efficient (e.g., may result in a large increase in signaling overhead). Improved quantization of coordination reporting may be beneficial.

As described in greater detail with reference to FIGS. 4-5, a UE 115 may generate statistical modeling of sensing outcomes (e.g., may identify one or more measurement statistics), and may transmit values that are quantized based on the one or more measurement statistics. Measurement statistics may include one or more of mean and variance of sensing results (e.g., channel quality measurements such as signal to interference ratio (SIR) determined based on sensing performed during a sensing window 305), auto-correlation of measurements or measurement statistics over time, auto-covariance, or the like. In some examples, the UE 115 may incorporate channel measurement statistics into a waveform (e.g., the coordination report) or otherwise compress the measurements. The UE 115 may measure the UE's own self-interference, and may indicate (e.g., in the coordination message) resource availability that reflects the measured self-interference. A receiving UE may use the coordination message to schedule subsequent sidelink communications (e.g., with the transmitting UE 115 or with other UEs 115).

FIG. 4 illustrates examples of availability reports 400 and 401 that supports techniques described herein. In some examples, availability reports 400 and 401 may be implemented by one or more wireless devices, such as UEs 115, which may be examples of corresponding devices described with reference to FIGS. 1-3.

In some examples, a UE 115 may transmit an availability report 400 that includes binary indications of resource availability. For instance, for each sidelink resource 405, the UE 115 may indicate whether the resource is available for use by another UE 115, or unavailable for use by the other UE 115. For instance, if the bit is set to 0, then the sidelink resource 405 may be unavailable. If the bit is set to 1, then the sidelink resource 405 may be available. However, as discussed herein, such a binary system may not account for different levels of availability, different levels of interference, different SIRs for different UEs 115, or the like. This may result in less efficient use of a sidelink channel (e.g., various sidelink resources 405 that could be utilized by at least a subset of local UEs 115 may remain unused).

In some examples, a UE 115 may transmit an availability report that contains soft resource availability information. In such examples, for each resource (e.g., in a selection window 315) the UE 115 may indicate $2^N$ different availability statuses (e.g., levels of availability) by using N bits (e.g., instead of one bit). The number of bits N may be configured or preconfigured for reporting UEs, dynamically set by a transmitting UE 115 in a request for a report. That is, a UE 115-$b$ (e.g., as described with reference to FIG. 2) may transmit a request message to a UE 115-$a$. In the request message, the UE 115-$b$ may request a coordination message (e.g., including an availability report 401), and may further indicate a value for N. In some examples, the value for N may be dynamically determined as a function of multiple RSRP measurements configured by the UE 115-$b$, a base station 105-$b$, or both. In some examples, the value for N may be dynamically determined by the UE 115-$a$ and reported back to the UE 115-$b$.

In some examples, the value of N may be adjusted (e.g., increased or decreased) based on one or more parameters. The one or more parameters may include a number of modulation coding scheme (MCS) levels used by the UE 115-$b$ (e.g., the transmitting UE 115), a number of priority levels of packets of the UE 115-$b$, a latency (e.g., a packet delay budget) threshold for the UE 115-$b$, a reliability requirement for the UE 115-$b$, a number of subchannels occupied by the reporting phase, a power control level used by the UE 115-$b$, a communication range requirement of the UE 115-$b$ and the UE 115-$a$, a distance or radio frequency distance of the UE 115-$a$ and the UE 115-$b$, zone identifiers of the UE 115-$a$ and the UE 115-$b$, a cast type of communication (e.g., unicast, groupcast, broadcast, or the like) between the UE 115-$b$ and the UE 115-$a$, a channel busy ratio (CBR) measured by one or both of the UE 115-$a$ and the UE 115-$b$, whether HARQ-ACK is utilized or not, or any combination thereof.

The availability report 401 may include soft resource availability information according to multiple levels (e.g., up to N bits). For instance, for N=2 (e.g., 4 levels), the UE 115-$a$ may indicate four different availability statuses (e.g., where 0 indicates that a resource is definitely not available, 1 indicates that a resource is weakly not available or non-preferred, 2 indicates that a resource is weakly available or preferred, and 3 indicates that a resource is definitely available). In some examples, the UE 115-$a$ may generate the soft availability information based on estimated SIR on a target link (e.g., between the UE 115-$a$ and the UE 115-$b$) due to an interfering transmission signal from a UE 115-$c$. For instance, the SIR between the UE 115-$b$ and the UE 115-$c$ (e.g., for a transmission from the UE 115-$b$ to the UE 115-$c$) may be calculated as an interference measurement between the UE 115-$a$ and the UE 115-$b$ minus an interference measurement between the UE 115-$a$ and the UE 115-$c$. In some examples, the interference measurements may be RSRP measurements, reference signal receive quality (RSRQ) measurements, or the like.

In some examples, the UE 115-$b$ (e.g., that receives the coordination message including the availability report 401) may utilize the received N-bit report based on the one or more parameters. The one or more parameters may include a number of MCS levels used by the UE 115-$b$ (e.g., for a higher MCS index a resource may be assumed to be unavailable while the same resource may be assumed to be available for a lower index), a number of priority levels of packets of the UE 115-$b$, a latency (e.g., a packet delay budget) threshold for the UE 115-$b$, a reliability requirement for the UE 115-$b$, a number of subchannels occupied by the reporting phase, a power control level used by the UE 115-$b$ (e.g., for lower transmit power levels, the UE 115-$b$ may use only resources that are available with high reliability or definitely available), a communication range requirement of the UE 115-$b$ and the UE 115-$a$, a distance or radio frequency distance of the UE 115-$a$ and the UE 115-$b$, zone identifiers of the UE 115-$a$ and the UE 115-$b$, a cast type of communication (e.g., unicast, groupcast, broadcast, or the like) between the UE 115-$b$ and the UE 115-$a$, a channel busy ratio (CBR) measured by one or both of the UE 115-$a$ and the UE 115-$b$, whether HARQ-ACK is utilized or not, or any combination thereof.

In some examples, the N-bit availability information may be combined with M-bit information that is present at the UE 115-$b$ by mapping the coarser information (e.g., the minimum between M and N) to the finer information bit depth or vice versa. When the UE 115-$b$ has no sensing results of the UE's own, the UE may make a decision based on an availability report 401 received for the UE 115-$a$ and not any other availability reports. In some examples, the UE 115-$b$ may receive the availability report 401, and may combine the availability report 401 with the UE's own view (e.g., the UE's own sensing results) to generate a complete or more accurate set of availability statuses for the sidelink resources 405 in the selection window.

In some examples, the availability statuses (e.g., 0, 1, 2, or 3) may be based on one or more threshold values (e.g., SIR thresholds). For instance, the UE 115-*a* may indicate that a sidelink resource 405 has an availability status of 0 (e.g., is available for a transmissions from the UE 115-*b* to the UE 115-*c*) if the SIR for the target link (e.g., between the UE 115-*b* and the UE 115-*c*) satisfies threshold 0. Similarly, the sidelink resource 405 may have an availability status of 1 if the SIR for the target link satisfies threshold 1, may have an availability status of 2 if the SIR for the target link satisfies threshold 2, and may have an availability status of 3 if the SIR for the target link exceeds threshold 2 (e.g., or satisfies a threshold 3).

In some examples, the thresholds may be flexible. The UE 115-*a* may utilize flexible quantization levels for determining an availability status for each sidelink resource 405. The UE 115-*a* may quantize sensing outcome reports for an inter-UE coordination procedure. Quantization of sensing outcomes may facilitate accurate and soft reporting, which may result in a receiving UE 115 (e.g., the UE 115-*b* or the UE 115-*c*), or a central UE 115 or central unit that collects and reports sensing data, to identify unused or available sidelink resources 405 more efficiently.

In some examples, sensing measurement reporting for inter-UE coordination may result in large payload size (e.g., especially when many UEs 115 are coordinating). Techniques described herein may result in reducing signaling overhead and payload size for coordination messages transmitted by each wireless device (e.g., UE 115). In some examples, UEs 115 may implement stochastical modeling of resource occupancy or availability, and techniques described herein may improve the prediction of resource availability for resources that are not reported (e.g., not indicated in a coordination report) by any reporting UEs 115.

As described in greater detail with reference to FIG. 5, a UE 115 may select a reporting pattern for sensing reporting from a set of reporting patterns to manage a payload size of a reporting message. In some examples, multiple reporting UEs may report which sensing pattern the respective UEs has selected to a central node (e.g., a receiving UE). In some cases, the sensing pattern may indicate a pattern of resources of a sidelink channel that is being reported in the reporting message (e.g., and one or more sidelink channel resources not being reported), and a resolution of resource availability statuses reported for a first subset of resources of a sidelink channel. In some examples, a base station or another UE may indicate which reporting pattern (e.g., from a set of configured patterns) that a UE is to use for sensing and generating the sensing report. In some examples, the UE may autonomously select the reporting pattern, and may transmit an indication of the pattern to the receiving UE. In some examples, a UE may measure and report auto-correlation, auto-covariance, cross-covariance, or other statistics for each resource. From this statistical information, and at least one measurement and report from another UE (e.g., upon receiving the sensing report from a transmitting UE), a receiving UE may generate a prediction of a full report (e.g., may combine one or more received reports, one or more measured statistics, or the like, to generate a full report of a set of resources).

Figure 5:
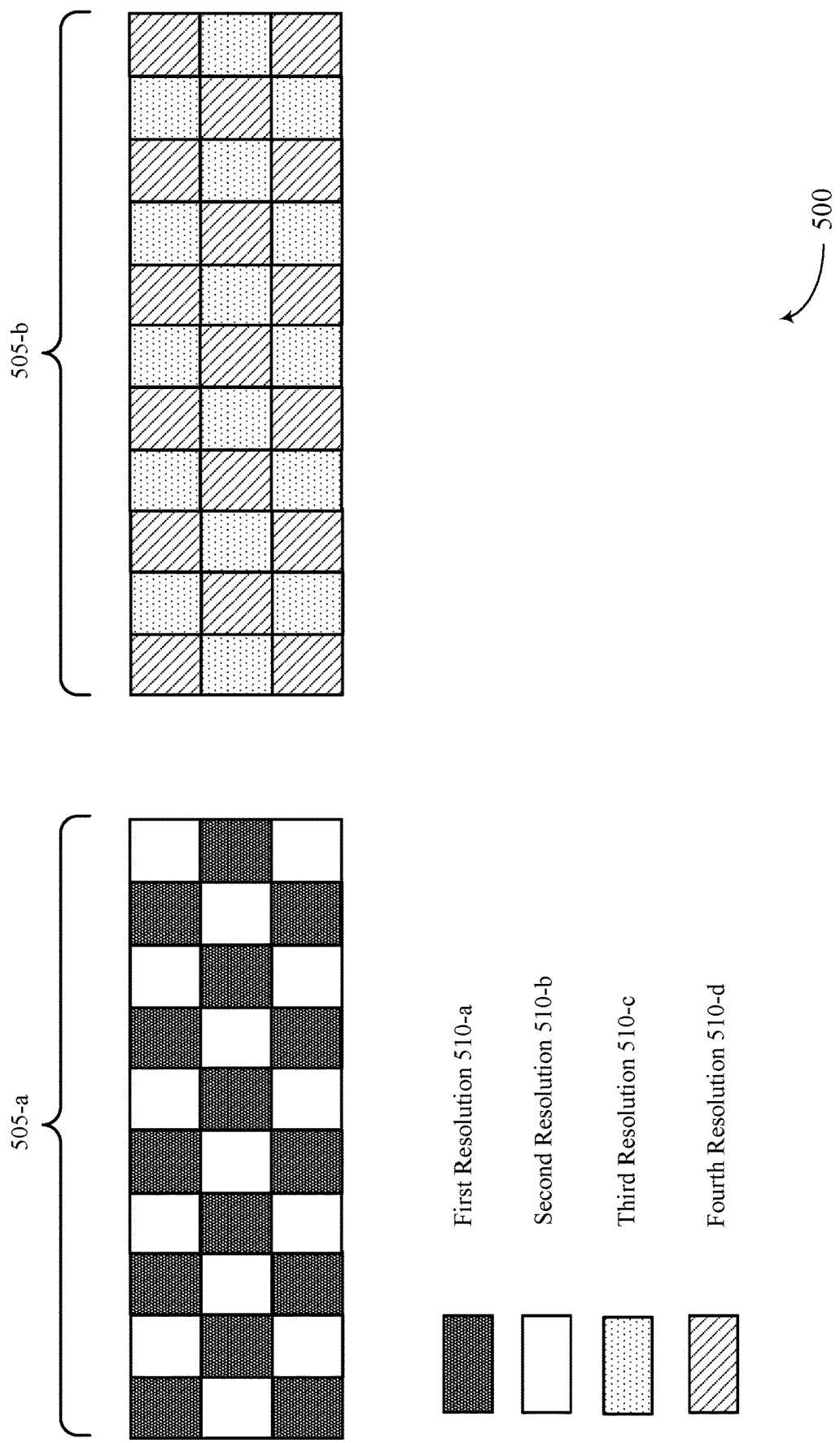
FIG. 5 illustrates an example of an availability reporting procedure that supports payload size reduction for reporting resource sensing measurements in accordance with aspects of the present disclosure.

FIG. 5 illustrates an example of an availability reporting procedure 500 that supports payload size reduction for reporting resource sensing measurements in accordance with aspects of the present disclosure. Availability reporting procedure 500 may be implemented by one or more wireless devices, such as UEs and base stations, which may be examples of UEs 115 and base stations 105 described with reference to FIGS. 1-4.

In some examples, a UE may transmit a reporting message (e.g., a coordination message) according to one or more reporting patterns 505. Each reporting pattern 505 may be defined for sensing and reporting such that each cooperating UE may report to a central node (e.g., a receiving UE) metric values for sidelink resources. In some examples, each reporting pattern may define one or more resources to be reported (e.g., and one or more resources not to be reported). In some examples, each reporting pattern may indicate one or more resources to be reported according to a first resolution (e.g., quantized with a full resolution of N bits) and one or more resources to be reported according to a second resolution (e.g., quantized with a resolution of M bits, where M may be less than N).

In some examples, a base station may configure a resource pool with multiple reporting patterns 505. Multiple UEs may agree on a reporting pattern 505 (e.g., and each reporting pattern may define corresponding quantization levels or quantization levels across resources). In some examples of techniques described herein, a UE (e.g., a leading UE, master UE, controlling UE, primary UE, receiving UE, or the like) may select a reporting pattern and indicate the selected reporting pattern to other UEs (e.g., via RRC signaling or MAC-CE signaling on a PC-5 interface, or in an SCI message (e.g., SCI-2) of a transmission, or in a dedicated PSSCH, or on dedicated resources for coordination). Coordinating UEs may suggest preferred or requested reporting patterns 505 based on one or more conditions. For instance, a UE may request a reporting pattern based on a quality of service (QoS) for a transmission satisfying a threshold, an MCS, TBSs, or any combination thereof.

For instance, a first UE may sense and report sidelink resource availability according to reporting pattern 505-*a*, and a second UE may sense and report sidelink resource availability according to reporting pattern 505-*b*. The first UE may perform sensing and generate metric values for a first set of resources according to a first resolution 510-*a* (e.g., quantized with a resolution of $N_1$ bits). In some examples, the first UE may perform sensing and generate a reporting message for a second set of resources according to a second resolution 510-*b* (e.g., quantized with a resolution of $M_1$ bits, where $N_1 > M_1$). Or, the first UE may refrain from sensing and reporting any metric values for the second set of resources (e.g., the second resolution 510-*b* is zero bits). The first UE may transmit the reporting message for the first and second sets of resources to the receiving UE, and the reporting message may indicate the report according to reporting pattern 505-*a*.

The second UE may perform sensing and generate a reporting message according to a third resolution 510-*c* (e.g., quantized with a resolution of $N_2$ bits) for the second set of resources (e.g., the same resources for which the first UE reported according to the first resolution 510-*a*). In some examples, the second UE may perform sensing and generate a reporting message for the first set of resources (e.g., the same resources for which the first UE reported according to the second resolution 510-*b*) according to a fourth resolution 510-*d* (e.g., quantized with a resolution of $M_2$ bits). Or, the first UE may refrain from sensing and reporting any metric values for the fourth set of resources (e.g., the fourth resolution 510-*d* is zero bits). The second UE may transmit the reporting message for the first and second sets of resources to the receiving UE, and the reporting message may indicate the report according to reporting pattern 505-*b*.

$N_1$ may be equal to $N_2$, or may be different than $N_2$. That is, the higher resolution reporting for different reporting patterns may be the same, or may be different.

Thus, by reporting according to different reporting patterns 505 (e.g., instead of quantizing all resources), the reporting UEs may quantize and report metric values for subsets of resources. Such reporting may reduce overhead compared to quantizing and reporting metric values for all resources. Additionally, or alternatively, by reporting metric values according to different resolutions (e.g., a resolution with fewer bits than a full resolution), the reporting UEs may quantize and report fewer bits for some resources (e.g., a subset of resources) or all of the resources. Such reporting may also, or further, reduce overhead compared to reporting the metric values with a full resolution. For instance, the first UE may use less bits for the second set of resources by reporting them at a lower resolution than the first set of resources 510-a, or may use no bits at all for reporting the second set of resources 510-b. This may result in less signaling overhead, smaller payload size, decreased system latency, and improved user experience. Additionally, or alternatively, by refraining from sensing for some resources (e.g., the second set of resources 510-b), the first UE may conserve power, resulting in longer battery life.

The UE may decrease a payload size, or effectively utilize available bits, by implementing techniques described herein. In some examples, reporting patterns 505 may be assigned to a set of UEs such that each UE reports (e.g., at a high resolution 510) a subset of resources. For example, each reporting pattern 505 may define different quantization levels (e.g., resolutions 510) N and M. For example, each UE may generate a reporting message for a R resources (e.g., in a selection window). A UE may use up to N bits per resource, so in total, a maximum size for the reporting message may be N×R (e.g., if the UE reports all metric values, such as RSRP, RSRQ, and SIR, for all of the R resources). The UE may be assigned (e.g., by the base station or another UE) a reporting pattern 505 to report $$\frac{1}{K}$$

of the R resources (e.g., assuming K cooperating UEs, for example, where the UE is assigned to report $$\frac{1}{K}$$

or resource measurements) wan resolution N bits and the remaining resources with resolution of M bits. This may result in a payload size of $$N\left(\frac{R}{K}\right) + M\left(R - \frac{R}{K}\right)$$

bits. In some examples, if M is equal to 0, then the UE may refrain from sending any information for those resources allocated for a resolution of M bits. If a UE sends a report with a reporting pattern 505 with few reporting resources only (e.g., less than half of all the resources, less than a third of all the resources, less than a quarter of all the resources, etc.) and M=0, then N may be larger, such that the resolution for the reported resources is higher than cases where the UE sends more reports for a higher number of resources. In such examples, each UE of a set of K UEs may report a few resources with a high resolution, resulting in more reliable information for the receiving UE.

The receiving UE may determine an accurate estimation of available resources based on receiving one or more reporting messages, the receiving UE's own sensing, or any combination thereof. If the first UE transmits a reporting message to the receiving UE according to reporting pattern 505-a, and the second UE transmits a reporting message to the receiving UE according to reporting pattern 505-b, the receiving UE may receive reporting information at a high resolution (e.g., N bits) for both the first set of resources and the second set of resources. For instance, the first UE may report half of a total set of potentially available resources according to first resolution 510-a, and the second UE may report the other half of the total set of potentially available resources according to third resolution 510-c (e.g., which may be the same as the first resolution 510-a). By receiving (e.g., and combining) both reporting messages, the receiving UE may accurately estimate the availability of all potentially available resources, without relying on every reporting UE reporting all resources at a highest available resolution. Such techniques may also be implemented by a receiving UE that combines the receiving UE's own report (e.g., the receiving UE's own sensing results) with a single report from a single transmitting UE, or with multiple transmitting UEs.

In some examples, techniques described herein may decrease the burden (e.g., computation resource use and power expenditures) for the receiving UE. For example, the receiving UE may be limited by power consumption requirements. In such examples, the receiving UE may determine resource availability and perform inter UE coordination based on received reporting messages (e.g., instead of relying entirely, or at all, on the UE's own sensing). This may result in decreased power expenditures and increased battery life for the receiving UE.

In some examples, each reporting pattern 505 may indicate a number of resources for which to sense and generate metric values according to a high resolution (e.g., N) and a lower resolution (e.g., M) on remaining resources (e.g., all other candidate resources of a set of candidate sidelink resources in a selection window, such as selection window 315). In some example, M may be less than N. In some examples, M may be equal to zero. In such examples, the UE may fall back on a default measurement configuration. For instance, the reporting UE may transmit an indication of a set of measurements (e.g., raw measurement data, instead of quantized availability statuses, as illustrated in greater detail with reference to FIG. 4). In some examples, if M is equal to zero, then the UE is not required to send any information for those resources and may not send any information for those resources. In some examples, quantization levels for different subsets (e.g., resolutions 510) may be agreed upon by coordinating UEs.

In some examples, a base station or another UE (e.g., a coordinating UE) may configure UEs with a set of L reporting patterns. The base station or UE may configure the L reporting patterns via radio resource control (RRC) signaling, media access control (MAC) control elements (CEs), or both. In some cases, the base station or other UE may indicate which reporting pattern 505 to use. For instance, the base station or the other UE may transmit control signaling indicating which of the set of L reporting patterns 505 the transmitting UE is to use.

In some examples, each UE may select the UE's own reporting pattern 505. In such examples, each UE may signal the UE's selected reporting pattern 505 to the receiving UE. For instance, the reporting UE may transmit an indication of the selected reporting pattern before signaling the reporting message. Each pattern may define quantization levels used, and which resources are reported. The reporting UE may model, as much as possible, information selected by the UE to indicate transmission characteristics for the reporting UE (e.g., such as a transport block (TB) size, preferred resources to signal or use, measurement statistics, metric values, previously scheduled communications, measured interference, or any combination thereof). The UE may select one pattern from a set of patterns defined on a per-resource pool basis (e.g., by a base station), or a base station may configure general patterns across all resource pools. In some examples, sets of reporting patterns may be defined by a primary UE (e.g., a controlling UE for a coordination procedure). In some examples, a UE may generate a reporting pattern 505 and send an indication of the pattern details to other UEs (e.g., via an SCI message, such as an SCI-2 message, or prior to communications in reporting via MAC-CE or RRC signaling). The reporting UE may transmit, in sidelink control information (SCI) (e.g., a second-stage SCI message) an indication of the selected reporting pattern 505. For instance, one of the reporting patterns 505 may be a full report of all resources, or a full resolution report of a first subset of resources and a lower resolution report of a second subset of resources, or no reporting information for the second subset of resources. Having transmitted the indication of the selected reporting pattern 505 via SCI, the UE may transmit the reporting message based on the selected reporting pattern 505 (e.g., on a physical sidelink shared channel (PSSCH)).

In some examples, as described in greater detail with reference to FIG. 6, a receiving UE may combine the receiving UE's own view of available resources during a resource reservation window with one or more reporting messages received from other UEs, or may combine multiple reporting messages, or both. The UE may then reserve or use available resources based on the combining.

Figure 6:
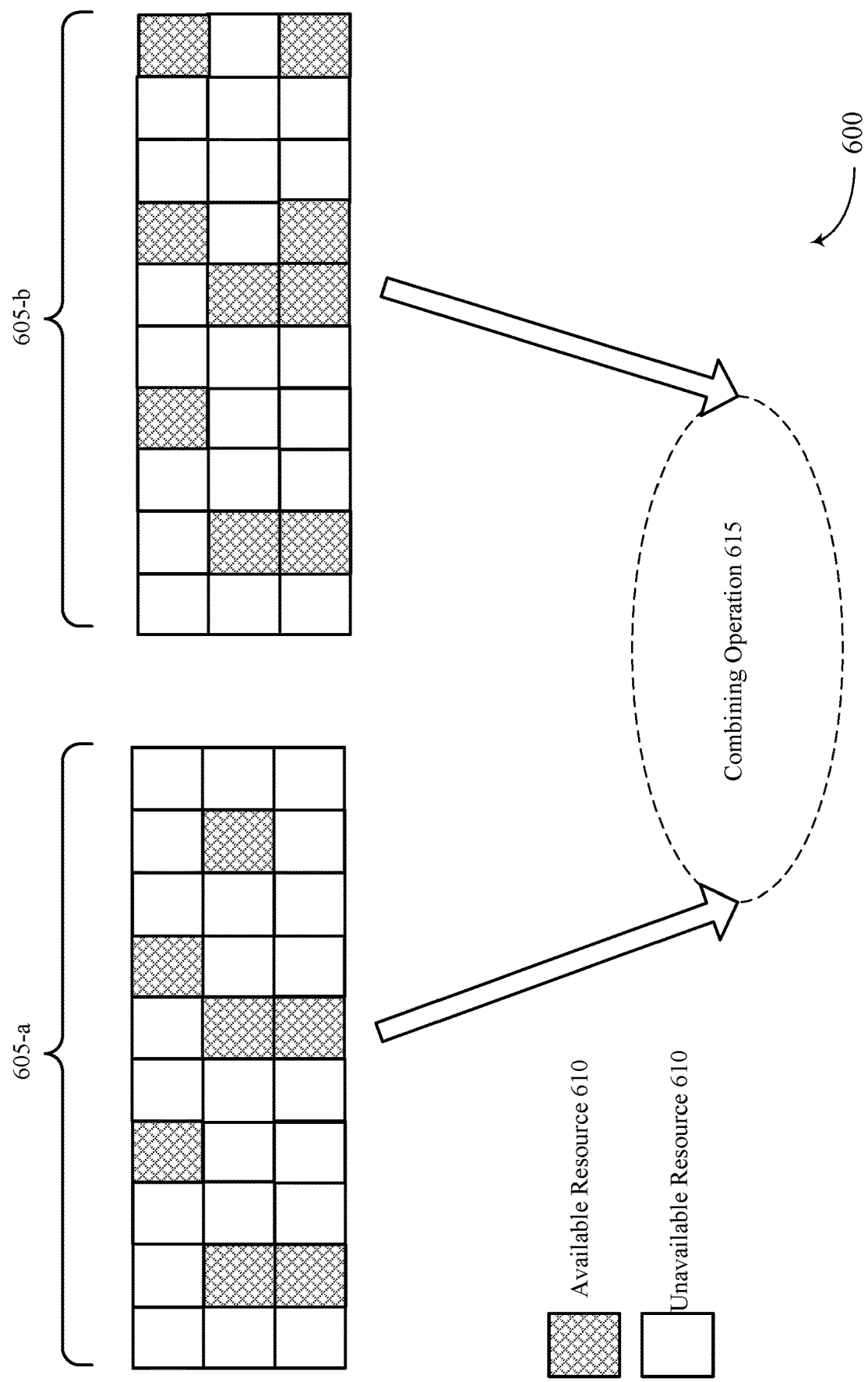
FIG. 6 illustrates an example of a report combination procedure that supports payload size reduction for reporting resource sensing measurements in accordance with aspects of the present disclosure.

FIG. 6 illustrates an example of a report combination procedure 600 that supports payload size reduction for reporting resource sensing measurements in accordance with aspects of the present disclosure. In some examples, the report combination procedure 600 may be implemented by one or more wireless devices, such as UEs, which may be examples of UEs 115 described with reference to FIGS. 1-5.

In some examples, due to correlation across time and frequency, sensing outcomes may be correlated. Improved prediction techniques may be used based on auto-correlation, cross-correlation, or both, for each resource, or for an entire grid of resources. For example, a UE may generate a model for each resource, and may compute auto-correlation and mean metric values for each resource or for a set of resources. The UE may report such models to other UEs, such that if those resources are not sensed at a current time, a latest measurement value may be used to predict a current sensing outcome. Such techniques may be successful because data traffic, sensing processes, or both, may follow some statistical models (e.g., resulting in accurate predictions of resource usage). Thus, resource use may be modeled as a stationary process with certain patterns.

For example, at a time n, a UE may transmit a first reporting message, and at time n+k (e.g., where k>0), the UE may transmit a second reporting message. The two reports may be generated in two different time slots. If the receiving UE can rely on the two reports and the potential temporal correlation between the resource usage, the receiving UE may be able to estimate or predict an exact resource occupancy. This may be the case, even though the UE may not report resource availability in the two reporting messages according to the same reporting pattern (e.g., the two reporting messages may indicate metric values for different subsets of resources). The receiving UE may be able to predict the outcoming of the sensing process at all resources (e.g., reported resources or unreported resources) using auto-correlation, mean metric values, or the like, of a per-resource process (e.g., predicting resource availability across time). The UE may use such data (e.g., auto-correlation across time) to determine resource availability of reported resources with more accuracy, or to determine resource availability for unreported resources, or both.

Additionally, or alternatively, a receiving UE may rely on correlation of availability across resources (e.g., cross-correlation of nearby resources). For example, the availability or metric values of one resource may be used to estimate the availability or metric values of other (e.g., nearby) resources. Thus, given a first report and a second report (e.g., from the same UE over time), a receiving UE may generate a full report of a set of resources (e.g., may generate a map of availability for all resources of the set of resources). The receiving UE may perform such auto-correlation, cross-correlation, or both, as described herein, for each reporting UE (e.g., by combining reports from each respective UE over time). By combining all of the reports, the UE may determine a probability that a resource is occupied or not occupied (e.g., available, not available, preferred, not preferred, etc.) based on each measurement, report, prediction, or any combination thereof.

In some examples, the receiving UE may receive reports (e.g., one report or multiple reports over time) from different transmitting UEs. Transmitting UEs may be experience power constraints, and the receiving UE may assist transmitting devices to determine available resources (e.g., based on receiving multiple reporting messages from multiple transmitting UEs, and generating a full report based on a combination of received reporting messages). For example, a first transmitting UE may transmit a first reporting message and a second transmitting UE may transmit a second reporting message to the receiving UE. Each of the transmitting UEs may have low sensing time (e.g., due to power constraints), and reports may be sparse (e.g., according to a reporting patter that reports for a small number of resources, or according to a smaller resolution). The first reporting message and the second reporting message may not overlapped (e.g., may be masked according to different reporting patterns). Based on the two reports, the receiving UE may predict an outcome of a sensing process at those resources (e.g., or neighboring or other unreported resources) using auto-correlation and mean metric values of a per resource process (e.g., the receiving UE may predict resource availability across time based on multiple reports from different UEs). The receiving UE may use statistics (e.g., metric values) received from the first transmitting UE to predict a total grid for the first transmitting UE, and the receiving UE can do the same for the second transmitting UE using the second report. The receiving UE may thus generate a full report for each transmitting UE. The UE may use the UE's own sensing along with such predictions to determine an occupancy of each resource.

In some examples, the UE may perform a combining operation 615 for one or more reports. The receiving UE may combine all reports (e.g., received or generated) using a probability that a resource is occupied or not occupied given all the measurements and predictions. For instance, the receiving UE may receive a first report 605-*a* (e.g., from a transmitting UE according to a reporting pattern, as described herein), or may generate a first report 605-*a* (e.g., based on cross-correlation, auto-correlation, multiple reports received from a same device, or the like). The UE may also receive a second report from a second transmitting UE, or may generate a second report for a second transmitting UE (e.g., based on cross-correlation, auto-correlation, multiple reports received from a same device, or the like). Each report may include one or more metric values for the resources indicated in the report. For example, each report may include an indication of one or more available resources 610-*a*, and one or more unavailable resources 610-*b*. The UE may perform combining operation 615, and may generate a full report for the full set of potentially available resources based thereon. For instance, the receiving UE may approximate the probability that a resource is unused or unoccupied given measurements from the other cooperating transmitting UEs (e.g., based on the first report and the second report and the quantization values used by the reporting UEs). The UE may do so based on measurements of auto-correlation and cross-correlation between resources (e.g., for all resources, or for resources that are next to or adjacent to other resources) from the perspective of each sensing UE.

In some examples, to facilitate a combining operation 615, each UE may measure and report auto-correlation, auto-covariance, cross-covariance, and metric values (e.g., measurement statistics) for each resource. Based on this information, and one or more reports received from transmitting UEs, a receiving UE may generate a prediction of resource availability for a full set of candidate resources. In some examples, each UE may include measured data (e.g., cross-correlation, auto-correlation, measurement statistics, or the like) in a coordination message, and receiving UEs may utilize such information in predicting resource availability.

For example, a UE may estimate or predict occupancy of resources according to a Bernoulli model. Bernoulli data may arrive at a UE. Such data may indicate a probability that there is traffic or not for a particular resource (e.g., in case of independent and identically distributed (IID) traffic). Such data my indicate a mean and autocorrelation function sampled at a periodicity time (e.g., in case of correlated traffic). Procedures may include a Bernoulli random process, resulting in a probability that there is an arrival of transmitted data at a given occasion. At the given occasion, the probability P that there is traffic may be represented as P=q, while the probability that there is no traffic may be represented as P=1−q. If there is a correlation between traffic occasions (e.g., resources) a measuring UE may send such relationship information to another cooperating UE. With a periodicity of p, where p may be a time difference between sensing occasions, a UE may simply signal an autocorrelation function sampled at multiples of periodicity p, and a mean of the process. The process of an arrival may be given by X(n), and the given periodicity p, such that an expectation of arrival may given by R(m)=Expectation (X(n)conj(X(n+m))), such that the base station may signal R(p), R(2p), and R(3p), etc., up to R(Vp) where V may be configurable and may depend on traffic (which depends on traffic correlation strength across time). From this information, a UE may predict the arrival at time n+m given the knowledge of arrival at X(n), where m may be a multiple of traffic periodicity p. The UE may determine, for future sensing occasions based on one or more old measurements, whether a resource would be occupied or not occupied.

Linear predictors of traffic at a time n+p, assuming a UE sensed the channel and found the RSRP/SIR greater than a threshold at a time n, may be represented by $x(n) \in \{0, 1\}$. If x(n)=1, a UE occupying a resource in time may be given by $$x(n+p) = \mu_x + \frac{c_{xx}(p)}{c_{xx}(0)}(x(n) - \mu_x) = q + \frac{c_{xx}(p)}{4q(1-q)}(x(n) - q),$$

where $\mu_x$=q, and $C_{xx}$ (0)=4q(1−q), and where $C_{xx}(p) = R_{xx}(p) - q^2$. If the UE is performing IID measurements across time, then such calculations may converge to x(n+p)=q. if the UE does not do any sensing, then a best estimate for the UE to use may be a mean value q, (e.g., with two equally likely outcomes), where if an outcome is 1, then the resource may be unoccupied, and otherwise, may be occupied. The decision (e.g., between occupied or unoccupied) may be made as follows: if x(n+p)≥½, then the UE may determine that q=1 (e.g., the resource is unused/unoccupied). If (n+p) <½, then q=0, (e.g., the resource is used/occupied).

If the UE has information about Y previous occasions, the UE may use techniques described herein to calculate auto-covariance vectors to predict a status at time m+n. To predict resource availability across resources, the UE may rely on cross-covariance. Other methods may include non-linear prediction methods, or modeling such as Markov decision processes at the UE. Such techniques may result in data across time for monitoring, or not monitoring, a current sensing occasion. The UE may attempt to optimize a best set of monitoring decisions across a window of X sensing occasions, then the UE may keep updating the learning parameters across time.

Figure 7:
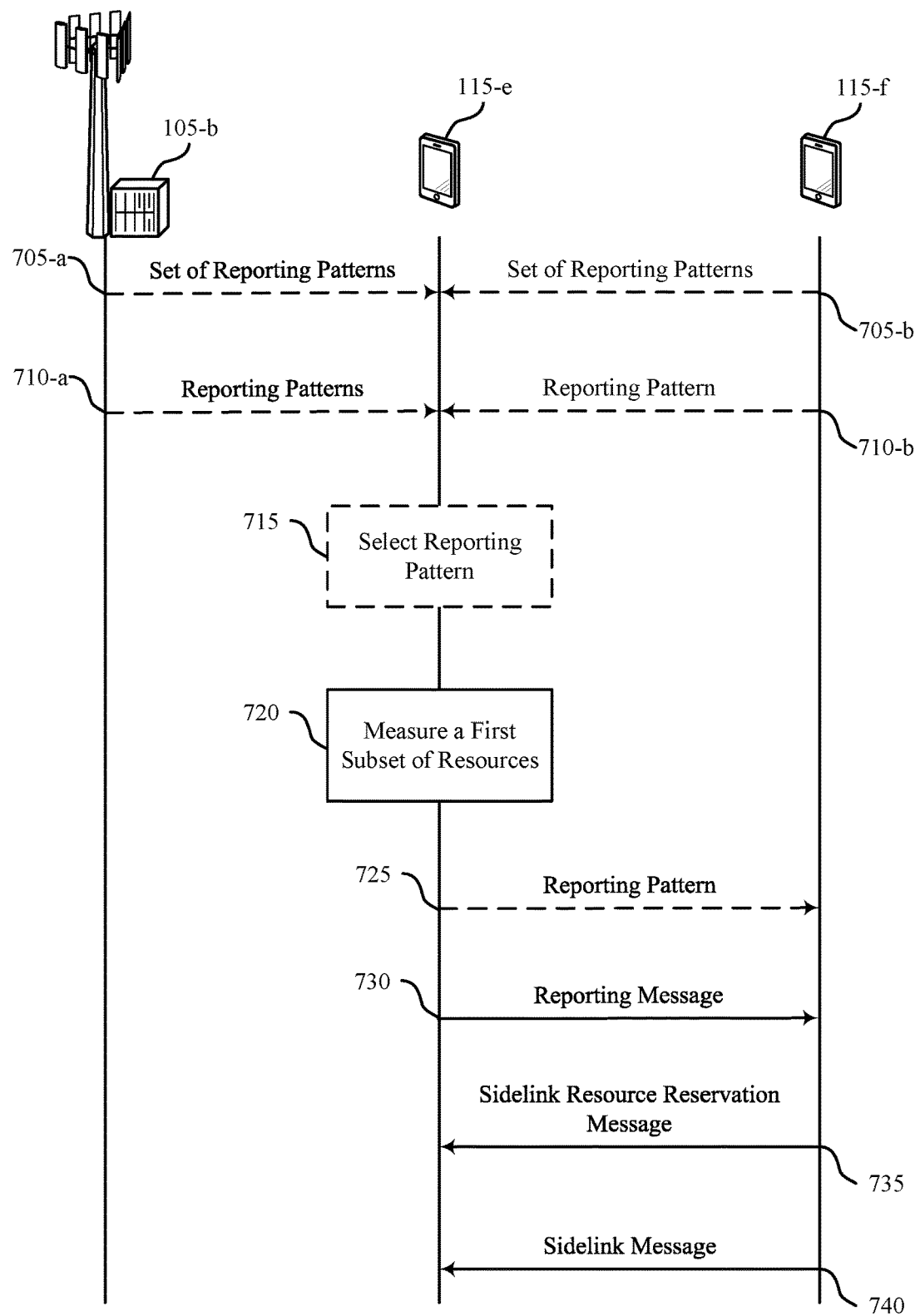
FIG. 7 illustrates an example of a process flow that supports payload size reduction for reporting resource sensing measurements in accordance with aspects of the present disclosure.

FIG. 7 illustrates an example of a process flow 700 that supports payload size reduction for reporting resource sensing measurements in accordance with aspects of the present disclosure. Process flow 700 may include a UE 115-*e* and a UE 115-*f*, which may be examples of corresponding devices (e.g., UEs 115) described with reference to FIGS. 1-6.

At 715, the UE 115-*e* may select a reporting pattern (e.g., from a set of reporting patterns). The reporting pattern may indicate a set of availability statuses (e.g., preferred, not-preferred, available, not available, or the like) for a set of sidelink resources (e.g., in a selection window). The reporting pattern may indicate a first resolution (e.g., quantization level) used to report each of a first set of metric values (e.g., for a first set of resources) and a second resolution (e.g., quantization level) used to report each of a second set of metric values (e.g., for a second set of resources). The first resolution and the second resolution may correspond to a number of bits for a quantization level. In some examples, the reporting pattern may indicate a metric value for each of the second subset of resources that are not to be reported in the reporting message (e.g., the UE 115-*e* may only report a first subset of resources but won't report a second subset of resources). In some examples, each metric value may represent a channel quality metric, whether a resource of the sidelink channel is available, or a level of availability of a resource of the sidelink channel.

In some examples, the UE 115-*e* may select the reporting pattern based on signaling from a base station 105-*b*, or another UE 115-*f*. For example, at 710-*a*, base station 105-*b* may transmit, to the UE 115-*e*, an indication of the reporting pattern, and the UE 115-*e* may select the indicated reporting pattern at 715. In some examples, at 710-*b*, another UE 115-*f* (e.g., a coordinating UE) may transmit an indication of the reporting pattern, and the UE 115-*e* may select the indicated reporting pattern at 715. In some examples, the base station 105-*b* may transmit, at 705-*a*, an indication of asset of reporting patterns (e.g., via RRC signaling, or a MAC-CE). In some examples, at 705-*b*, another UE 115-*f* (e.g., a coordinating UE) may configure the UE 115-*e* with the set of reporting patterns. In such examples, at 710, the base station 105-*b* or the UE 115-*f* may indicate the reporting pattern (e.g., via an index associated with one reporting pattern of the set of reporting patterns).

In some examples, the UE 115-*e* may autonomously select the reporting pattern. In such examples, the UE 115-*e* may perform measurements at 720, and may transmit an indication of the selected reporting message to the UE 115-*f* at 725. For example, the UE 115-*e* may include an indication of the reporting pattern in the reporting message transmitted at 730. In some examples, the UE 115-*e* may transmit the indication of the reporting message (e.g., in an SCI) at 725, and may transmit the reporting message (e.g., on a PSSCH) at 730.

At 720, the UE 115-*e* may perform one or more measurements (e.g., during a sensing window) as described in greater detail with reference to FIG. 3. For example, the UE may measure a first subset of resources of a sidelink channel to generate one or more channel quality measurements (e.g., RSRP, RSRQ, SIR, or the like), of the sidelink channel. The UE may generate a reporting message (e.g., a coordination message) for transmission at 725. In some examples, the UE 115-*e* may perform measurements on the second subset of resources of the sidelink channel according to the resource pattern. In some examples, the UE 115-*e* may refrain from performing measurements on the second subset of resources of the sidelink channel according to the resource pattern.

At 730, the UE 115-*e* may transmit, to the UE 115-*f* based at least in part on the resource reporting pattern selected at 715, a reporting message (e.g., a coordination message). The reporting message may indicate a first set of metric values for the first subset of resources of the sidelink channel based at least in part on the channel quality measurements performed at 720.

In some examples, the reporting pattern selected at 715 may indicate metric value reporting for the first subset of resources that is different than for a second subset of resources of the sidelink channel. For example, the UE 115-*e* may transmit, in the reporting message at 730, the first set of metric values for the first set of resources, and the second set of metric values for the second set of resources. Each of the first set of metric values may be selected form a first number of quantization levels (e.g., resolutions), and each of the second set of metric values may be selected from the first number of quantization levels. In some examples, the two quantization levels may be different. The UE may quantize the metric values for the first set of resources (e.g., and the second set of resources) using quantization levels indicated by the reporting pattern selected at 715. In some examples, the UE may report the first set of metric values for the first subset of resources according to a first quantization level (e.g., indicated by a first number of bits) and may report the second set of metric values for the second subset of resources according to a second quantization level (e.g., indicated by a second number of bits that is less than the first number of bits) according to a first reporting pattern selected at 715. In some examples, the UE may report the first set of metric values for the first subset of resources according to a first quantization level (e.g., indicated by a first number of bits), but may refrain from reporting (e.g., or measuring at 720) metric values for the second set of resources according to a second reporting pattern.

At 735, having received the reporting message at 735, the UE 115-*f* may transmit a sidelink resource reservation message (e.g., to the UE 115-*e*, to another UE 115, or both). The sidelink resource reservation message may reserve one or more sidelink resources of the first subset of resources. For instance, the reporting message may indicate that one or more of the first subset of resources is available for reservation, and the UE 115-*f* may reserve these resources accordingly.

At 740, the UE 115-*f* may transmit a sidelink message (e.g., to the UE 115-*e* or to any other UE 115) on the sidelink resources reserved at 735.

Figure 8:
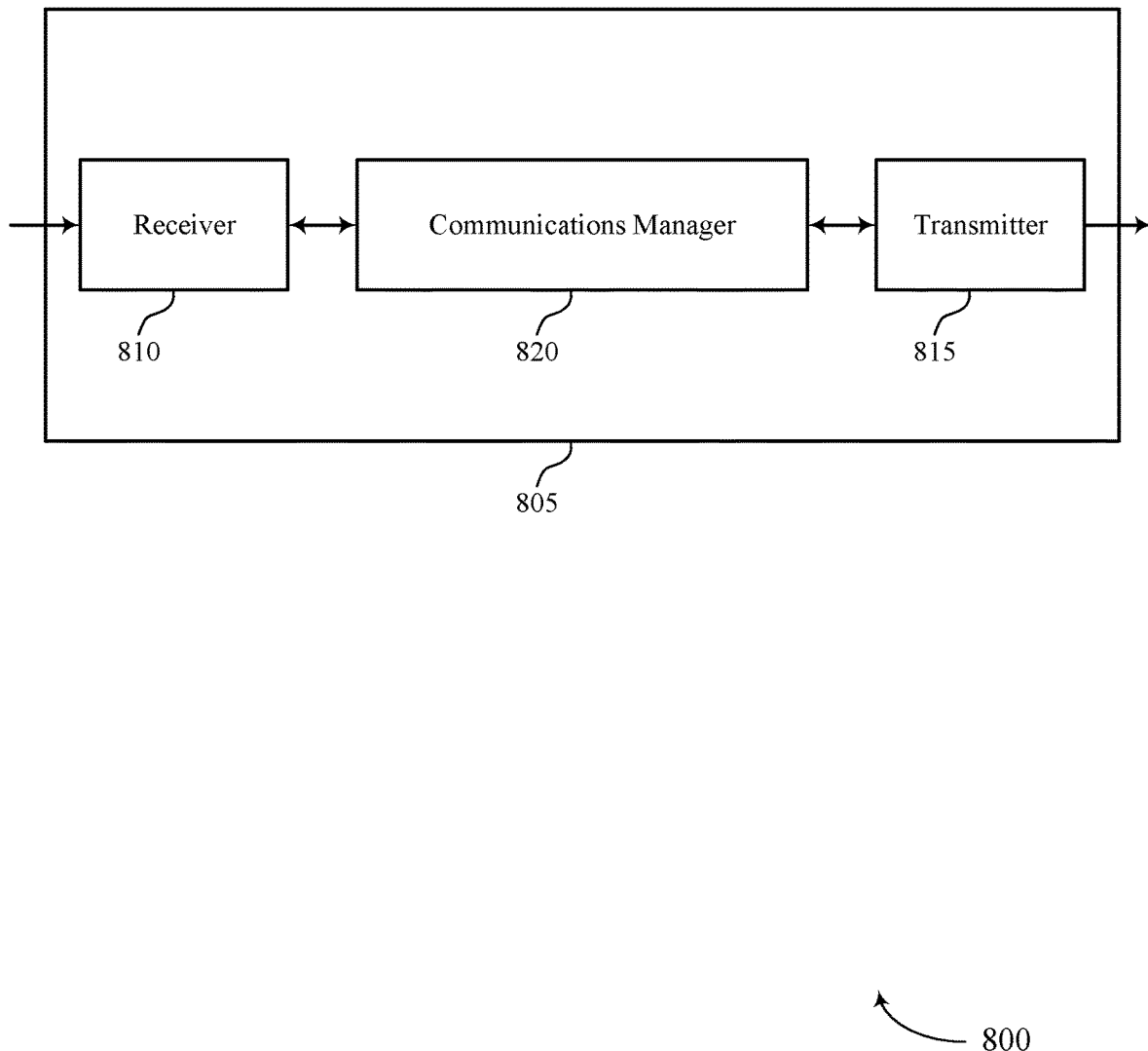
FIGS. 8 and 9 show block diagrams of devices that support payload size reduction for reporting resource sensing measurements in accordance with aspects of the present disclosure.

FIG. 8 shows a block diagram 800 of a device 805 that supports payload size reduction for reporting resource sensing measurements in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to payload size reduction for reporting resource sensing measurements). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to payload size reduction for reporting resource sensing measurements). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of payload size reduction for reporting resource sensing measurements as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. For example, the communications manager 820 may be configured as or otherwise support a means for measuring a first subset of resources of a sidelink channel to generate a set of multiple channel quality measurements of the sidelink channel. The communications manager 820 may be configured as or otherwise support a means for transmitting, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reporting resource sensing measurements resulting in decreased payload size, increased throughput, more accurate resource availability reporting, more efficient use of wireless resources, decreased power expenditure, increased battery life, and improved user experience.

Figure 9:
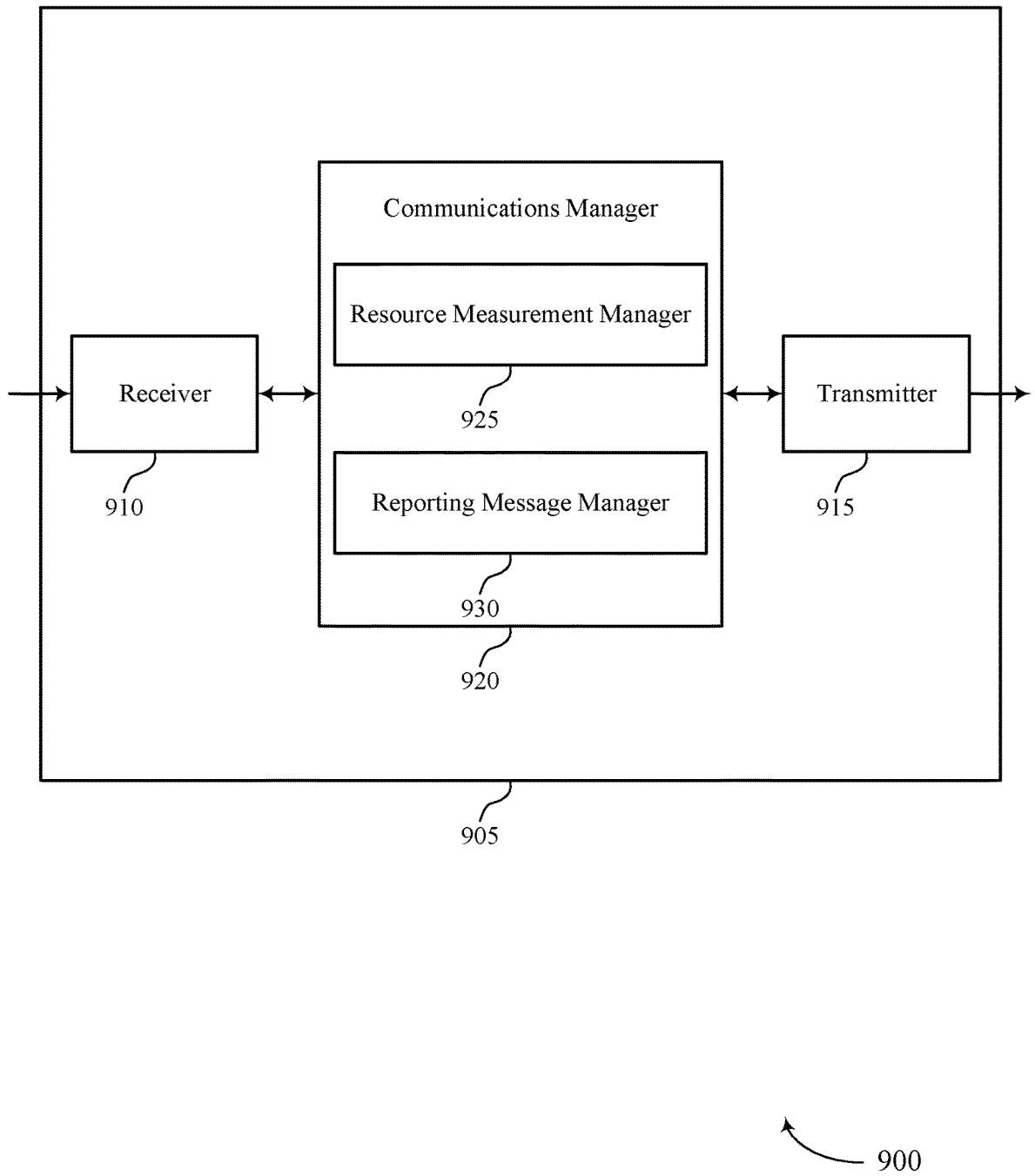

FIG. 9 shows a block diagram 900 of a device 905 that supports payload size reduction for reporting resource sensing measurements in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to payload size reduction for reporting resource sensing measurements). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to payload size reduction for reporting resource sensing measurements). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of payload size reduction for reporting resource sensing measurements as described herein. For example, the communications manager 920 may include a resource measurement manager 925 a reporting message manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a first UE in accordance with examples as disclosed herein. The resource measurement manager 925 may be configured as or otherwise support a means for measuring a first subset of resources of a sidelink channel to generate a set of multiple channel quality measurements of the sidelink channel. The reporting message manager 930 may be configured as or otherwise support a means for transmitting, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel.

Figure 10:
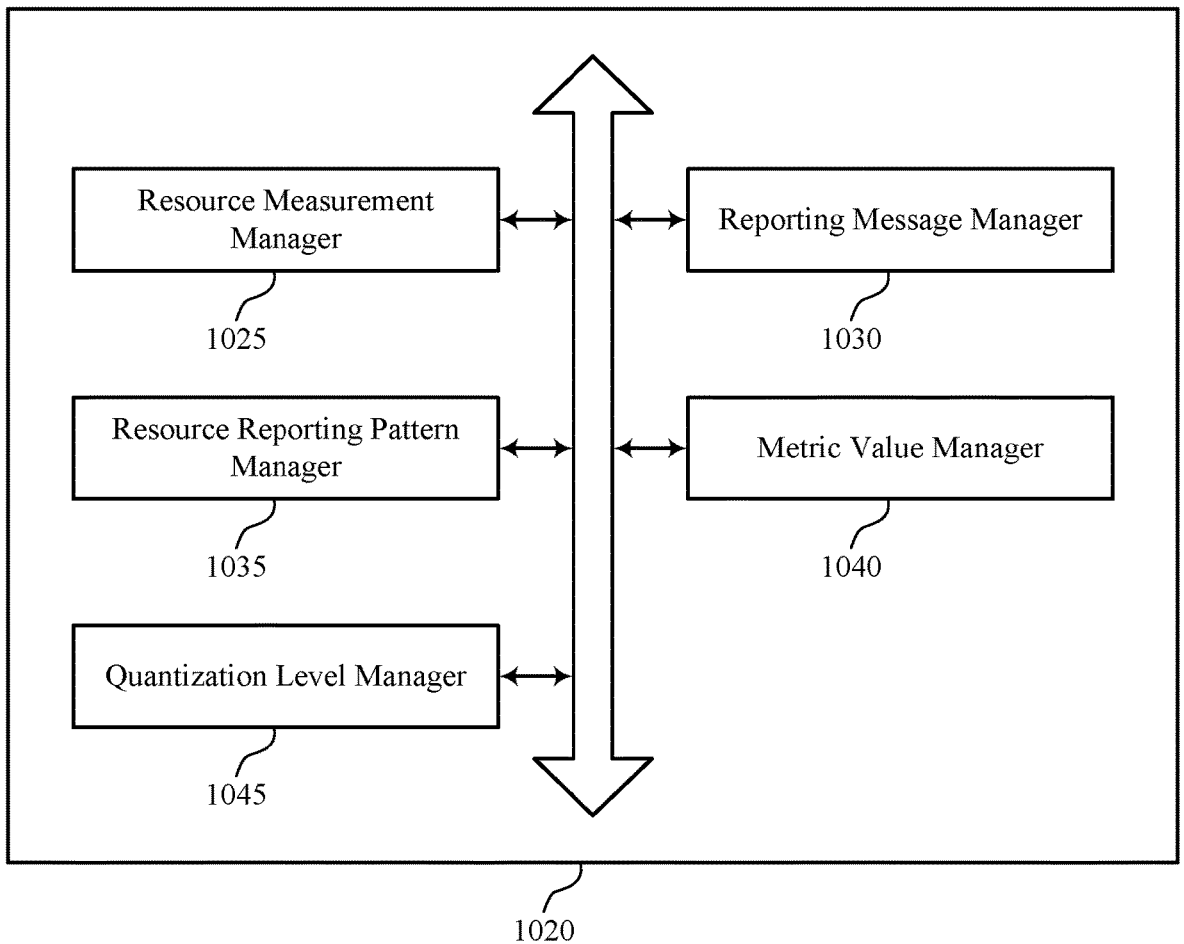
FIG. 10 shows a block diagram of a communications manager that supports payload size reduction for reporting resource sensing measurements in accordance with aspects of the present disclosure.

FIG. 10 shows a block diagram 1000 of a communications manager 1020 that supports payload size reduction for reporting resource sensing measurements in accordance with aspects of the present disclosure. The communications manager 1020 may be an example of aspects of a communications manager 820, a communications manager 920, or both, as described herein. The communications manager 1020, or various components thereof, may be an example of means for performing various aspects of payload size reduction for reporting resource sensing measurements as described herein. For example, the communications manager 1020 may include a resource measurement manager 1025, a reporting message manager 1030, a resource reporting pattern manager 1035, a metric value manager 1040, a quantization level manager 1045, or any combination thereof. Each of these components may communicate, directly or indirectly, with one another (e.g., via one or more buses).

The communications manager 1020 may support wireless communications at a first UE in accordance with examples as disclosed herein. The resource measurement manager 1025 may be configured as or otherwise support a means for measuring a first subset of resources of a sidelink channel to generate a set of multiple channel quality measurements of the sidelink channel. The reporting message manager 1030 may be configured as or otherwise support a means for transmitting, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel.

In some examples, the reporting pattern indicates a first resolution is used to report each of the first set of metric values and a second resolution is used to report each of a second set of metric values for the second subset of resources. In some examples, the reporting pattern indicates that metric values for the second subset of resources are not to be reported in the reporting message. In some examples, each resource reporting pattern of the set of resource reporting patterns indicates a set of quantization levels. In some examples, each metric value, of the first set of metric values, represents at least one of a channel quality metric, whether a resource of the sidelink channel is available, or a level of availability of a resource of the sidelink channel.

In some examples, the resource reporting pattern manager 1035 may be configured as or otherwise support a means for receiving, from a base station or another UE, control signaling indicating to use the resource reporting pattern. In some examples, the resource reporting pattern manager 1035 may be configured as or otherwise support a means for receiving, from a base station or another UE, control signaling including an indication of a set of resource reporting patterns. In some examples, the resource reporting pattern manager 1035 may be configured as or otherwise support a means for selecting, the resource reporting pattern from the set of resource reporting patterns. In some examples, transmitting the reporting message including a second set of metric values for the second subset of resources, where each of the first set of metric values indicated in the reporting message has a first number of bits that is greater than a second number of bits used to report each of the second set of metric values.

In some examples, the resource reporting pattern manager 1035 may be configured as or otherwise support a means for transmitting, to the second UE, the reporting message or a control message indicating the resource reporting pattern. In some examples, the reporting message includes a sidelink control information message.

In some examples, to support transmitting the reporting message, the metric value manager 1040 may be configured as or otherwise support a means for transmitting the reporting message including a second set of metric values for the second subset of resources, where each of the first set of metric values is selected from a first number of quantization levels that is greater than a second number of quantization levels for each of the second set of metric values.

In some examples, the quantization level manager 1045 may be configured as or otherwise support a means for quantizing a first channel quality measurement of the set of multiple channel quality measurements to a first quantization level of a set of multiple quantization levels for a first resource of the first subset of resources, where the reporting message indicates the first quantization level for the first resource.

In some examples, the resource measurement manager 1025 may be configured as or otherwise support a means for refraining from measuring, for the sensing window, a second subset of resources of the sidelink channel that differs from the first subset of resources.

Figure 11:
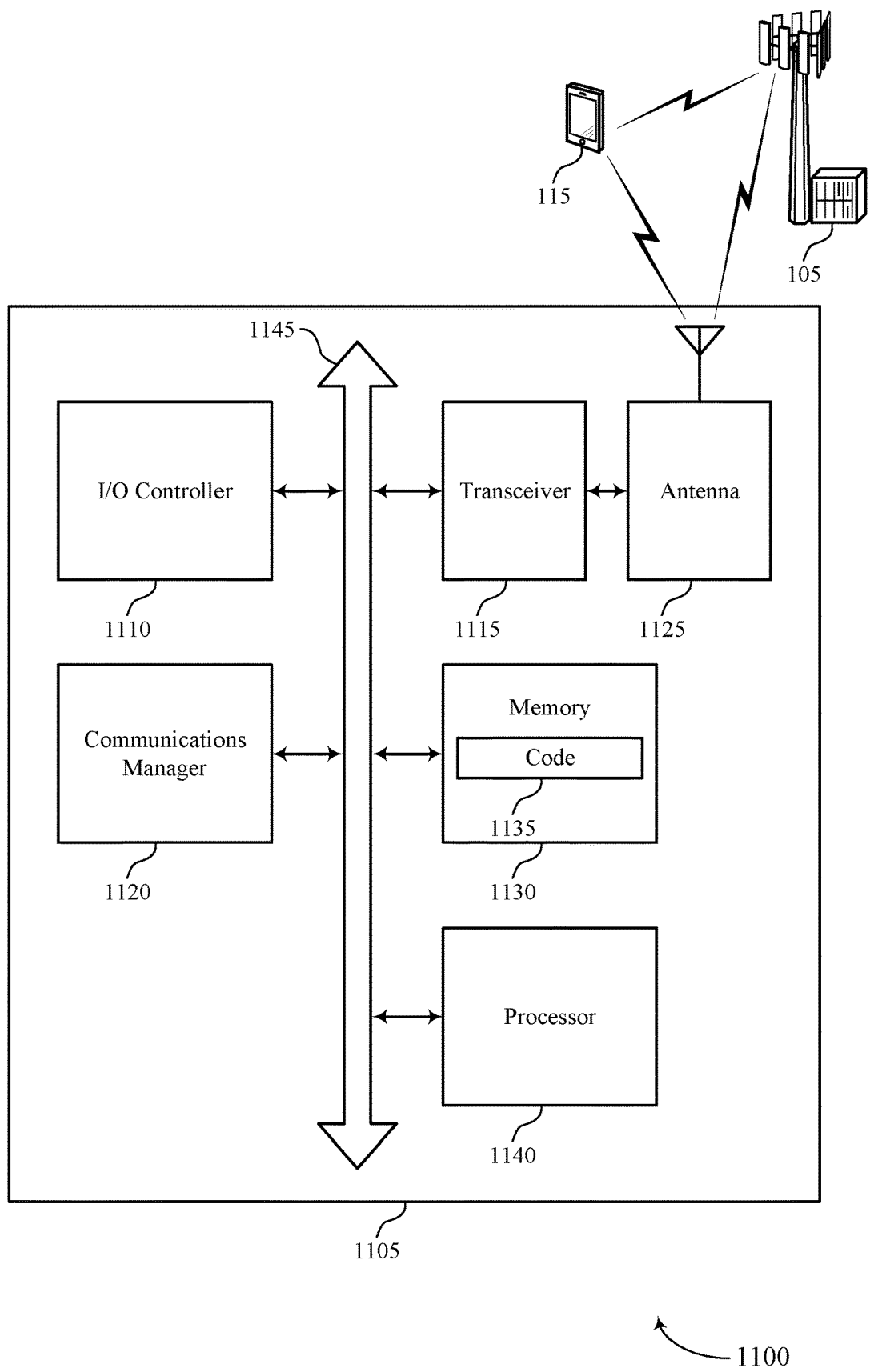
FIG. 11 shows a diagram of a system including a device that supports payload size reduction for reporting resource sensing measurements in accordance with aspects of the present disclosure.

FIG. 11 shows a diagram of a system 1100 including a device 1105 that supports payload size reduction for reporting resource sensing measurements in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting payload size reduction for reporting resource sensing measurements). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a first UE in accordance with examples as disclosed herein. For example, the communications manager 1120 may be configured as or otherwise support a means for measuring a first subset of resources of a sidelink channel to generate a set of multiple channel quality measurements of the sidelink channel. The communications manager 1120 may be configured as or otherwise support a means for transmitting, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel.

By including or configuring the communications manager 1120 in accordance with examples as described herein, the device 1105 may support techniques for reporting resource sensing measurements resulting in decreased payload size, increased throughput, more accurate resource availability reporting, more efficient use of wireless resources, decreased power expenditure, increased battery life, and improved user experience.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of payload size reduction for reporting resource sensing measurements as described herein, or the processor 1140 and the memory 1130 may be otherwise configured to perform or support such operations.

Figure 12:
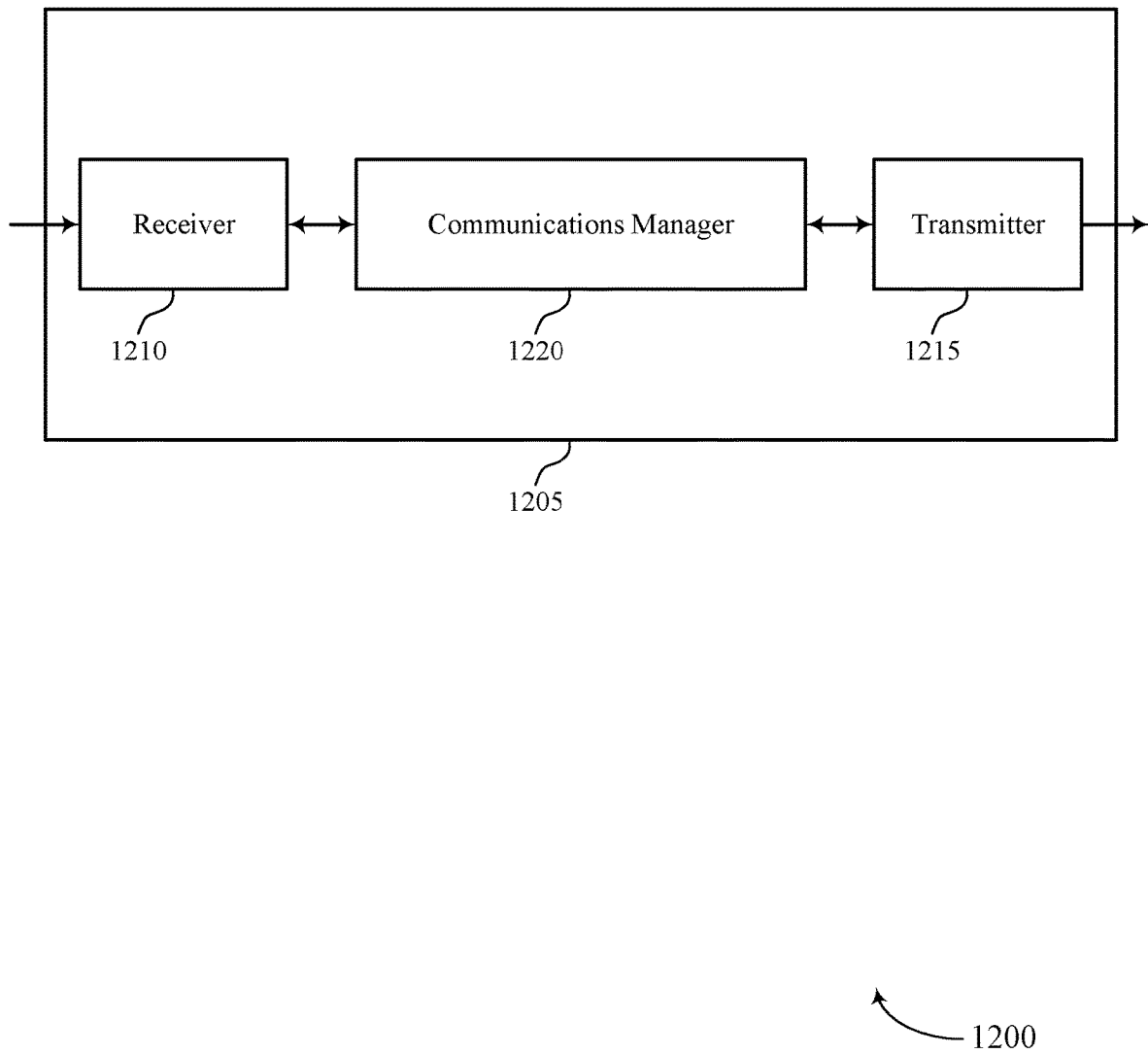
FIGS. 12 and 13 show block diagrams of devices that support payload size reduction for reporting resource sensing measurements in accordance with aspects of the present disclosure.

FIG. 12 shows a block diagram 1200 of a device 1205 that supports payload size reduction for reporting resource sensing measurements in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to payload size reduction for reporting resource sensing measurements). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to payload size reduction for reporting resource sensing measurements). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of payload size reduction for reporting resource sensing measurements as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a second UE in accordance with examples as disclosed herein. For example, the communications manager 1220 may be configured as or otherwise support a means for receiving, from a first UE, a reporting message indicating a first set of metric values for a first subset of resources of a sidelink channel according to a resource reporting pattern. The communications manager 1220 may be configured as or otherwise support a means for transmitting a sidelink resource reservation message reserving one or more sidelink resources of the first subset of resources based on the reporting message. The communications manager 1220 may be configured as or otherwise support a means for transmitting a sidelink message on the reserved one or more sidelink resources of the first subset of resources.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for reporting resource sensing measurements resulting in decreased payload size, increased throughput, more accurate resource availability reporting, more efficient use of wireless resources, decreased power expenditure, increased battery life, and improved user experience.

Figure 13:
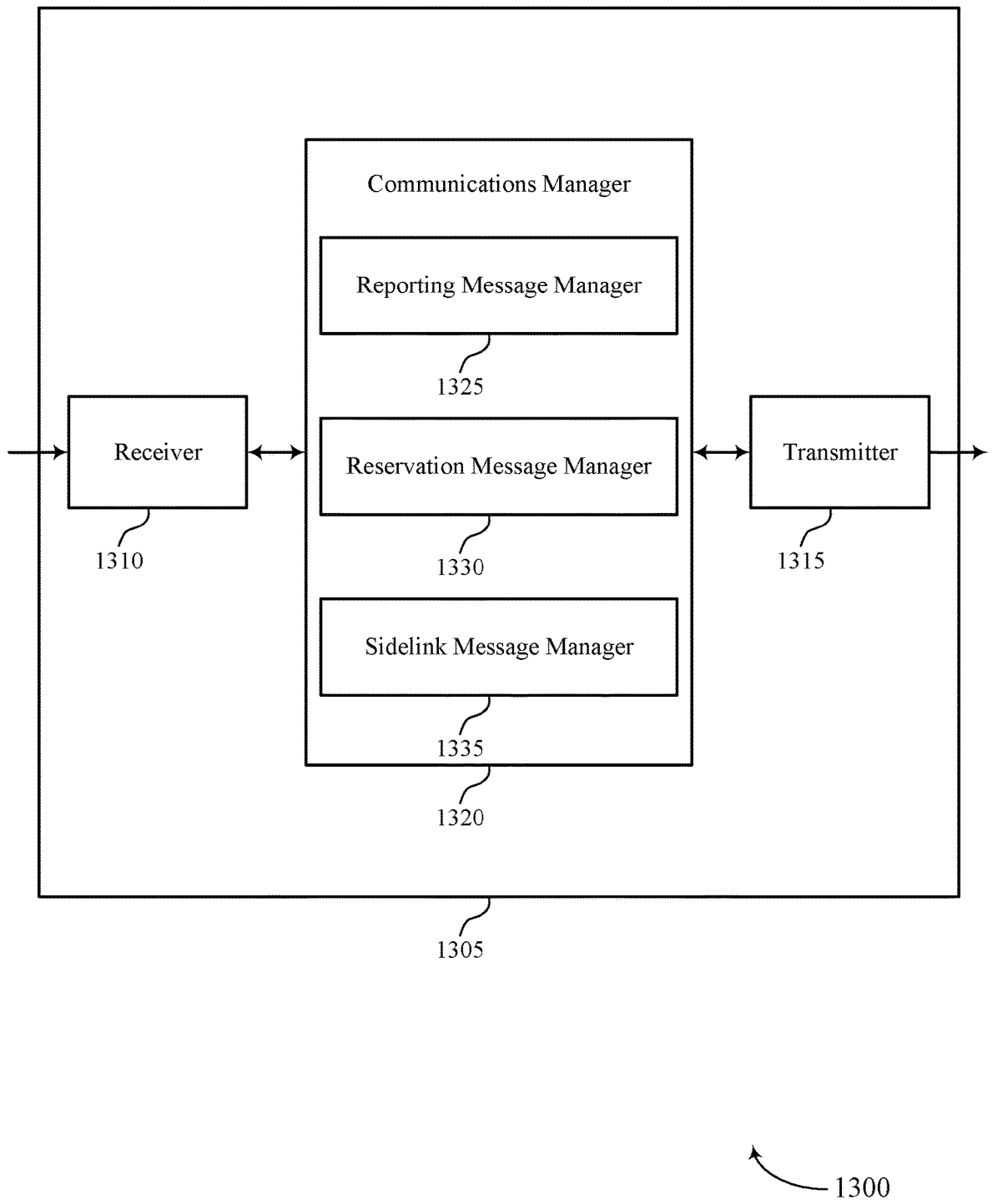

FIG. 13 shows a block diagram 1300 of a device 1305 that supports payload size reduction for reporting resource sensing measurements in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to payload size reduction for reporting resource sensing measurements). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to payload size reduction for reporting resource sensing measurements). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of payload size reduction for reporting resource sensing measurements as described herein. For example, the communications manager 1320 may include a reporting message manager 1325, a reservation message manager 1330, a sidelink message manager 1335, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a second UE in accordance with examples as disclosed herein. The reporting message manager 1325 may be configured as or otherwise support a means for receiving, from a first UE, a reporting message indicating a first set of metric values for a first subset of resources of a sidelink channel according to a resource reporting pattern. The reservation message manager 1330 may be configured as or otherwise support a means for transmitting a sidelink resource reservation message reserving one or more sidelink resources of the first subset of resources based on the reporting message. The sidelink message manager 1335 may be configured as or otherwise support a means for transmitting a sidelink message on the reserved one or more sidelink resources of the first subset of resources.

Figure 14:
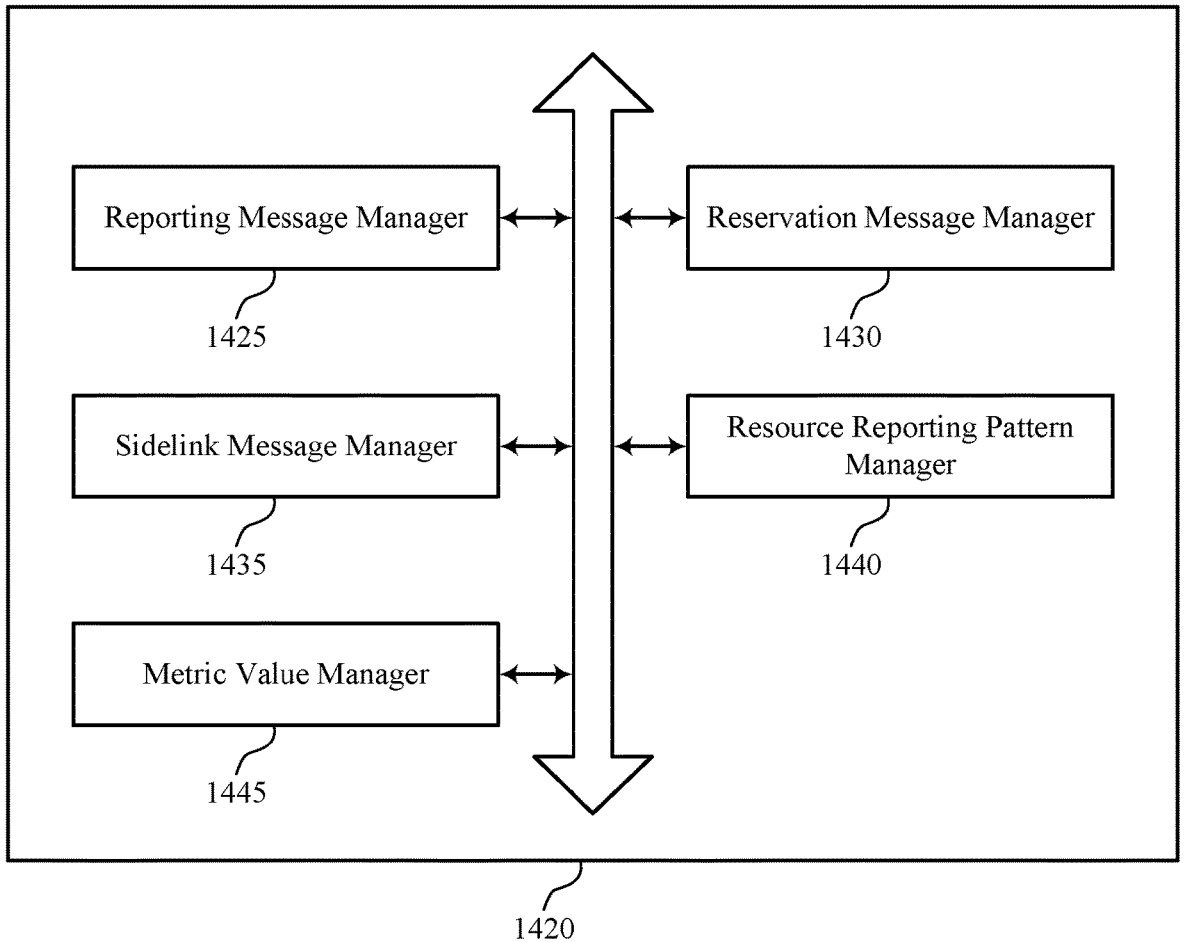
FIG. 14 shows a block diagram of a communications manager that supports payload size reduction for reporting resource sensing measurements in accordance with aspects of the present disclosure.

FIG. 14 shows a block diagram 1400 of a communications manager 1420 that supports payload size reduction for reporting resource sensing measurements in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of payload size reduction for reporting resource sensing measurements as described herein. For example, the communications manager 1420 may include a reporting message manager 1425, a reservation message manager 1430, a sidelink message manager 1435, a resource reporting pattern manager 1440, a metric value manager 1445, or any combination thereof. Each of these components may communicate, directly or indirectly, with one another (e.g., via one or more buses).

The communications manager 1420 may support wireless communications at a second UE in accordance with examples as disclosed herein. The reporting message manager 1425 may be configured as or otherwise support a means for receiving, from a first UE, a reporting message indicating a first set of metric values for a first subset of resources of a sidelink channel according to a resource reporting pattern. The reservation message manager 1430 may be configured as or otherwise support a means for transmitting a sidelink resource reservation message reserving one or more sidelink resources of the first subset of resources based on the reporting message. The sidelink message manager 1435 may be configured as or otherwise support a means for transmitting a sidelink message on the reserved one or more sidelink resources of the first subset of resources.

In some examples, the resource reporting pattern manager 1440 may be configured as or otherwise support a means for transmitting, to the first UE, control signaling indicating an instruction to use the first resource reporting pattern of a set of multiple different resource reporting patterns.

In some examples, the resource reporting pattern manager 1440 may be configured as or otherwise support a means for receiving, from a base station or another UE, control signaling including an indication of a set of resource reporting patterns including the resource reporting pattern.

In some examples, to support receiving the reporting message, the metric value manager 1445 may be configured as or otherwise support a means for receiving the reporting message including a second set of metric values for a second subset of resources of the sidelink channel according to the resource reporting pattern, where each of the first set of metric values is selected from a first number of quantization levels that is greater than a second number of quantization levels for each of the second set of metric values.

In some examples, the resource reporting pattern manager 1440 may be configured as or otherwise support a means for receiving, from the first UE, control signaling including an indication of the resource reporting pattern. In some examples, the control signaling includes a sidelink control information message. In some examples, the resource reporting pattern includes an indication of a set of quantization levels.

In some examples, the reporting message manager 1425 may be configured as or otherwise support a means for receiving, from a third UE, a second reporting message indicating a second set of metric values for a second subset of resources of the sidelink channel according to a second resource reporting pattern. In some examples, the metric value manager 1445 may be configured as or otherwise support a means for determining a metric value for one or more sidelink resource of the sidelink channel based on the first set of metric values and the second set of metric values, where transmitting the sidelink resource reservation message is based on the determining.

In some examples, determining the metric value is based on performing an auto correlation procedure, a cross-correlation procedure, or both, based on the first set of metric values and the second set of metric values. In some examples, the reporting pattern indicates a first resolution is used to report each of the first set of metric values and a second resolution is used to report each of a second set of metric values for the second subset of resources. In some examples, the reporting pattern indicates that metric values for the second subset of resources are not to be reported in the reporting message. In some examples, a channel quality metric, whether a resource of the sidelink channel is available, or a level of availability of a resource of the sidelink channel.

Figure 15:
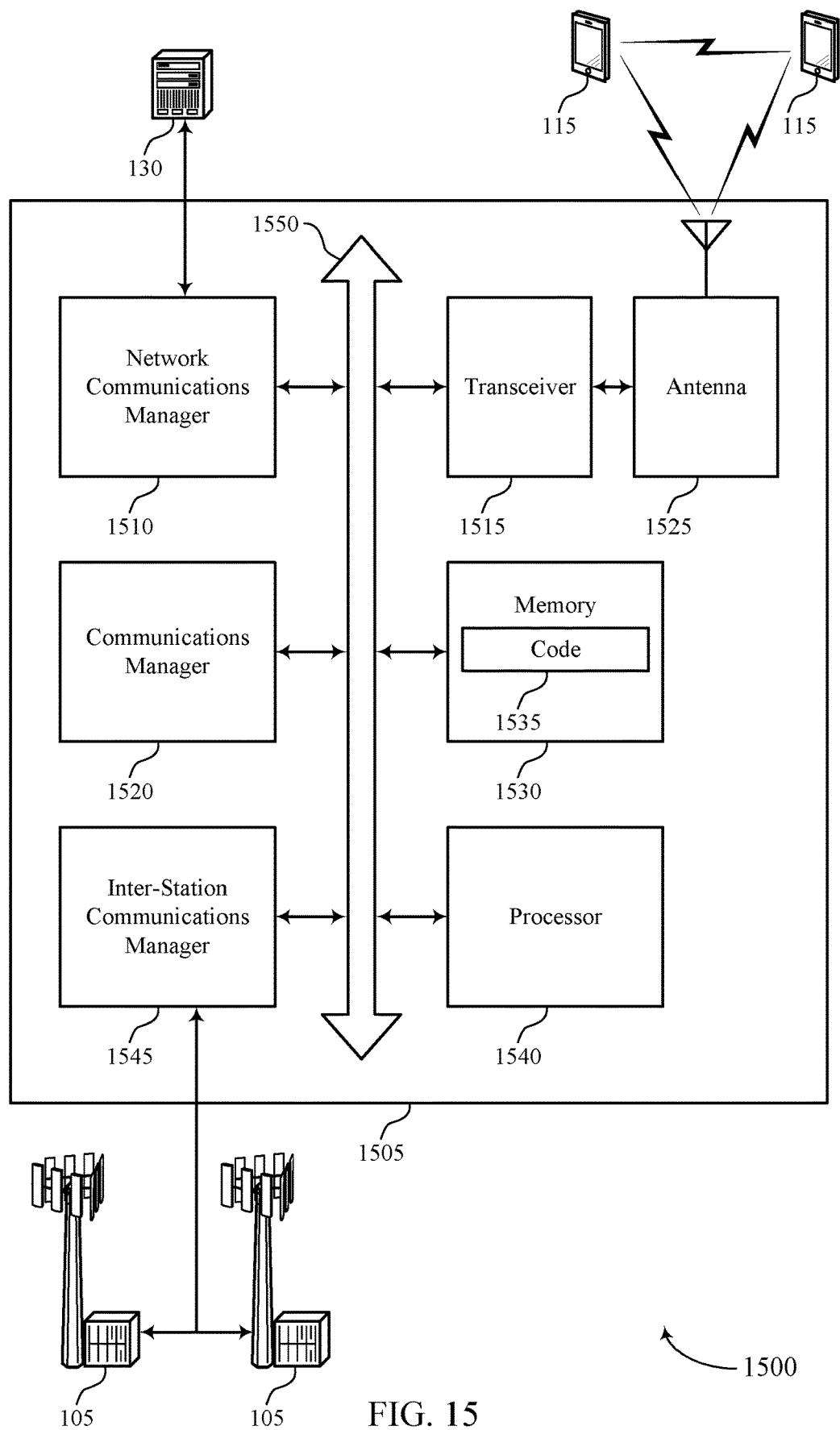
FIG. 15 shows a diagram of a system including a device that supports payload size reduction for reporting resource sensing measurements in accordance with aspects of the present disclosure.

FIG. 15 shows a diagram of a system 1500 including a device 1505 that supports payload size reduction for reporting resource sensing measurements in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting payload size reduction for reporting resource sensing measurements). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a second UE in accordance with examples as disclosed herein. For example, the communications manager 1520 may be configured as or otherwise support a means for receiving, from a first UE, a reporting message indicating a first set of metric values for a first subset of resources of a sidelink channel according to a resource reporting pattern. The communications manager 1520 may be configured as or otherwise support a means for transmitting a sidelink resource reservation message reserving one or more sidelink resources of the first subset of resources based on the reporting message. The communications manager 1520 may be configured as or otherwise support a means for transmitting a sidelink message on the reserved one or more sidelink resources of the first subset of resources.

By including or configuring the communications manager 1520 in accordance with examples as described herein, the device 1505 may support techniques for reporting resource sensing measurements resulting in decreased payload size, increased throughput, more accurate resource availability reporting, more efficient use of wireless resources, decreased power expenditure, increased battery life, and improved user experience.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of payload size reduction for reporting resource sensing measurements as described herein, or the processor 1540 and the memory 1530 may be otherwise configured to perform or support such operations.

Figure 16:
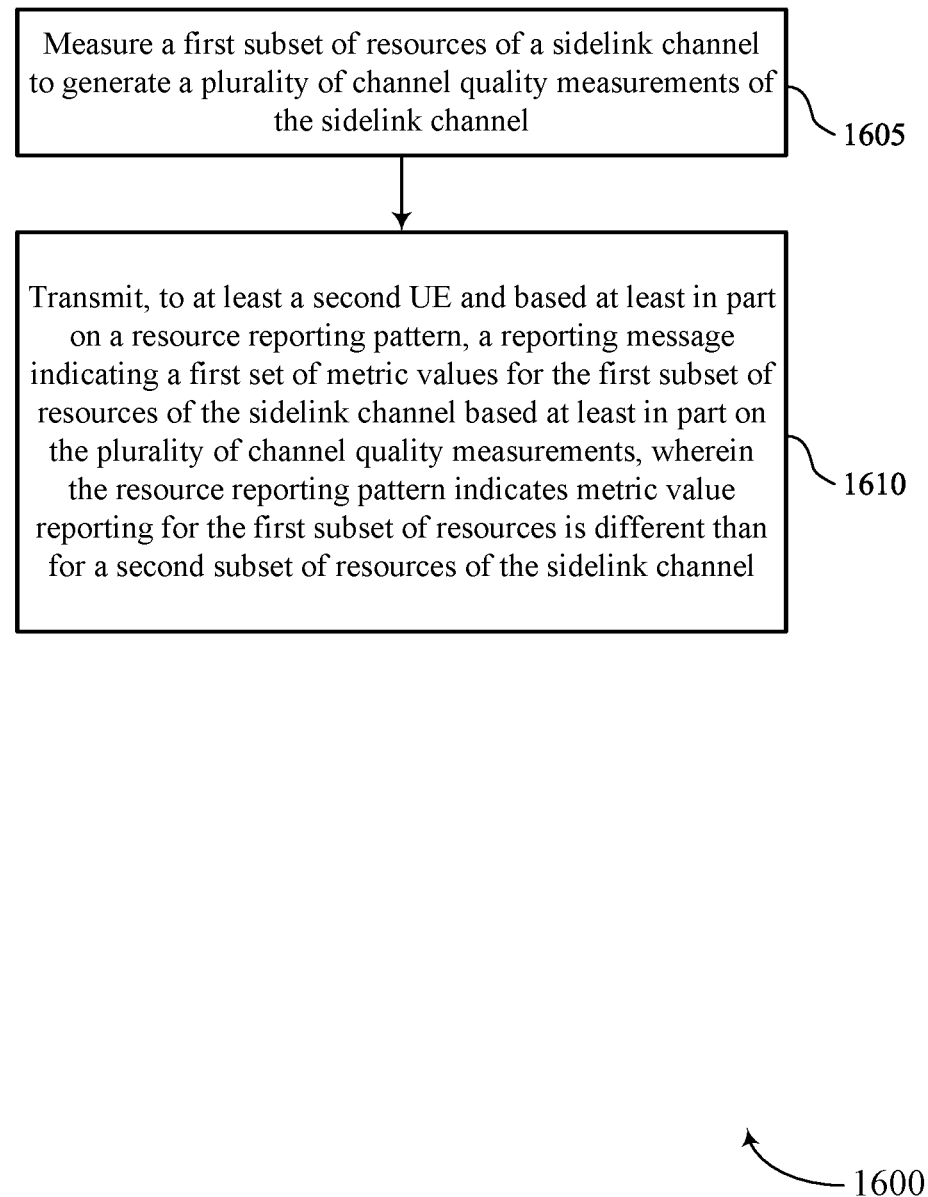
FIGS. 16 through 19 show flowcharts illustrating methods that support payload size reduction for reporting resource sensing measurements in accordance with aspects of the present disclosure.

FIG. 16 shows a flowchart illustrating a method 1600 that supports payload size reduction for reporting resource sensing measurements in accordance with aspects of the present disclosure. The operations of the method 1600 may be implemented by a UE or the UE's components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include measuring a first subset of resources of a sidelink channel to generate a set of multiple channel quality measurements of the sidelink channel. The operations of 1605 may be performed in accordance with examples as disclosed herein. In some examples, aspects of the operations of 1605 may be performed by a resource measurement manager 1025 as described with reference to FIG. 10.

At 1610, the method may include transmitting, to at least a second UE and based on a resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel. The operations of 1610 may be performed in accordance with examples as disclosed herein. In some examples, aspects of the operations of 1610 may be performed by a reporting message manager 1030 as described with reference to FIG. 10.

Figure 17:
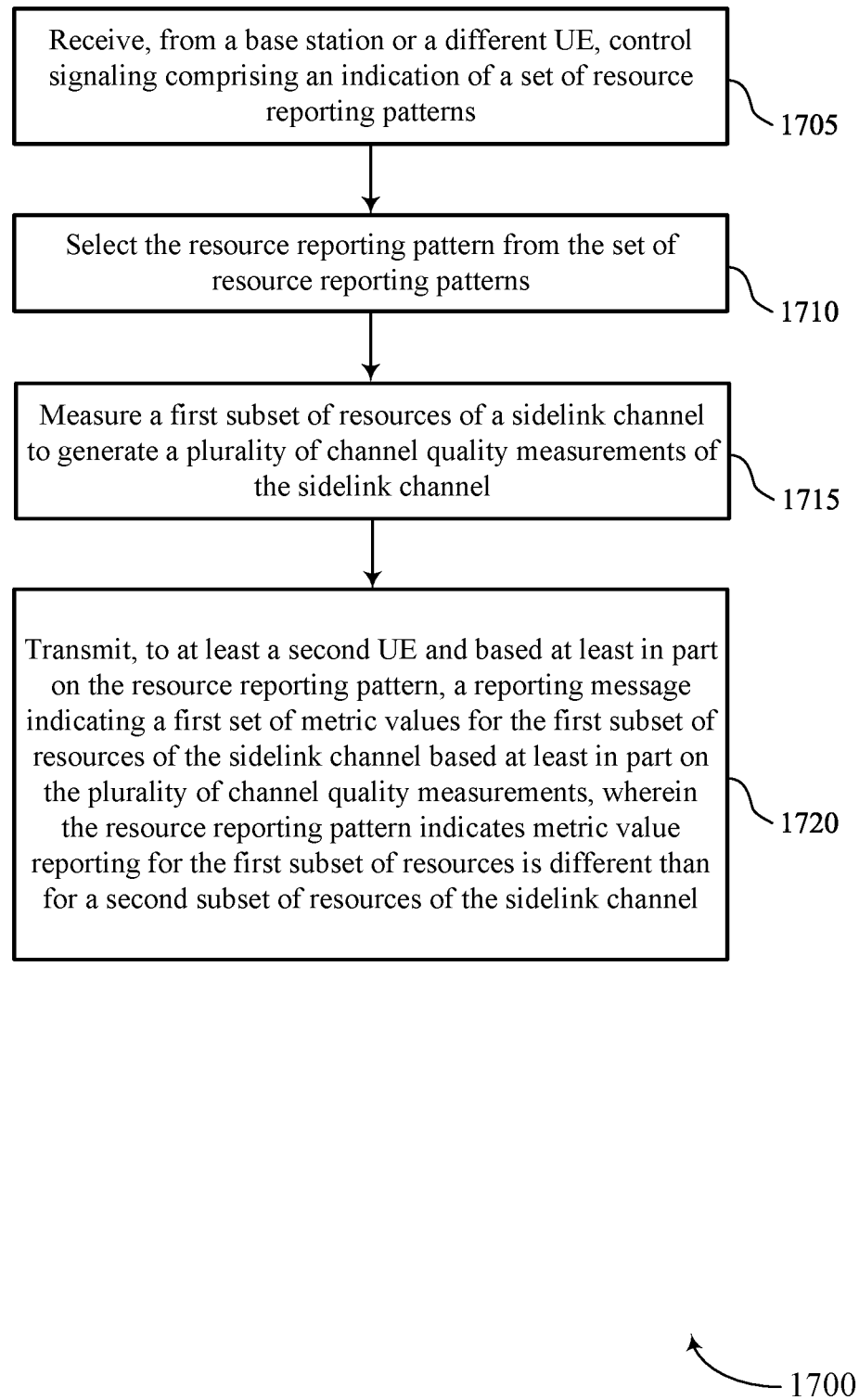

FIG. 17 shows a flowchart illustrating a method 1700 that supports payload size reduction for reporting resource sensing measurements in accordance with aspects of the present disclosure. The operations of the method 1700 may be implemented by a UE or the UE's components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from a base station or another UE, control signaling including an indication of a set of resource reporting patterns. The operations of 1705 may be performed in accordance with examples as disclosed herein. In some examples, aspects of the operations of 1705 may be performed by a resource reporting pattern manager 1035 as described with reference to FIG. 10.

At 1710, the method may include selecting the resource reporting pattern from the set of resource reporting patterns. The operations of 1710 may be performed in accordance with examples as disclosed herein. In some examples, aspects of the operations of 1710 may be performed by a resource reporting pattern manager 1035 as described with reference to FIG. 10.

At 1715, the method may include measuring a first subset of resources of a sidelink channel to generate a set of multiple channel quality measurements of the sidelink channel. The operations of 1715 may be performed in accordance with examples as disclosed herein. In some examples, aspects of the operations of 1715 may be performed by a resource measurement manager 1025 as described with reference to FIG. 10.

At 1720, the method may include transmitting, to at least a second UE and based on the resource reporting pattern, a reporting message indicating a first set of metric values for the first subset of resources of the sidelink channel based on the set of multiple channel quality measurements, where the resource reporting pattern indicates metric value reporting for the first subset of resources is different than for a second subset of resources of the sidelink channel. The operations of 1720 may be performed in accordance with examples as disclosed herein. In some examples, aspects of the operations of 1720 may be performed by a reporting message manager 1030 as described with reference to FIG. 10.

Figure 18:
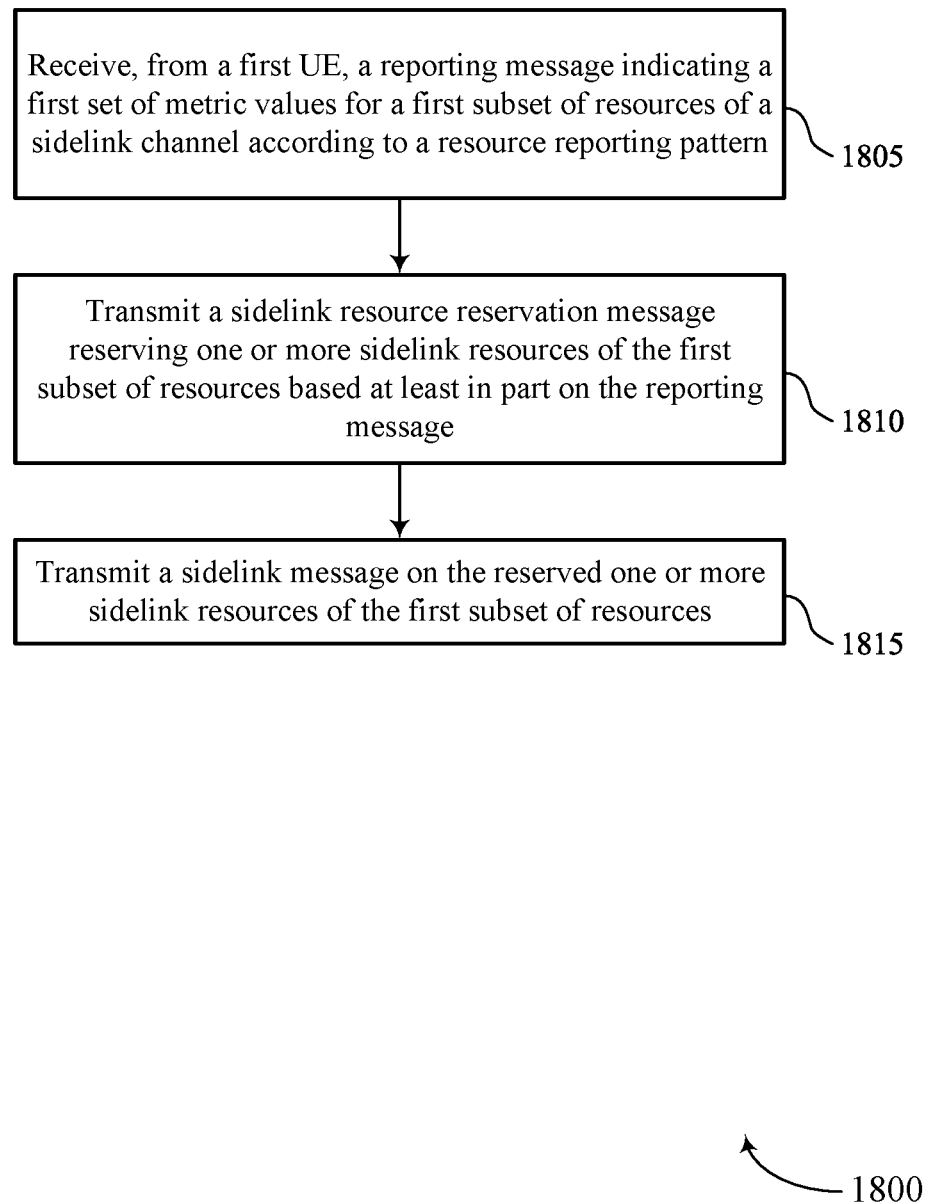

FIG. 18 shows a flowchart illustrating a method 1800 that supports payload size reduction for reporting resource sensing measurements in accordance with aspects of the present disclosure. The operations of the method 1800 may be implemented by a base station or the base station's components as described herein. For example, the operations of the method 1800 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1805, the method may include receiving, from a first UE, a reporting message indicating a first set of metric values for a first subset of resources of a sidelink channel according to a resource reporting pattern. The operations of 1805 may be performed in accordance with examples as disclosed herein. In some examples, aspects of the operations of 1805 may be performed by a reporting message manager 1425 as described with reference to FIG. 14.

At 1810, the method may include transmitting a sidelink resource reservation message reserving one or more sidelink resources of the first subset of resources based on the reporting message. The operations of 1810 may be performed in accordance with examples as disclosed herein. In some examples, aspects of the operations of 1810 may be performed by a reservation message manager 1430 as described with reference to FIG. 14.

At 1815, the method may include transmitting a sidelink message on the reserved one or more sidelink resources of the first subset of resources. The operations of 1815 may be performed in accordance with examples as disclosed herein. In some examples, aspects of the operations of 1815 may be performed by a sidelink message manager 1435 as described with reference to FIG. 14.

Figure 19:
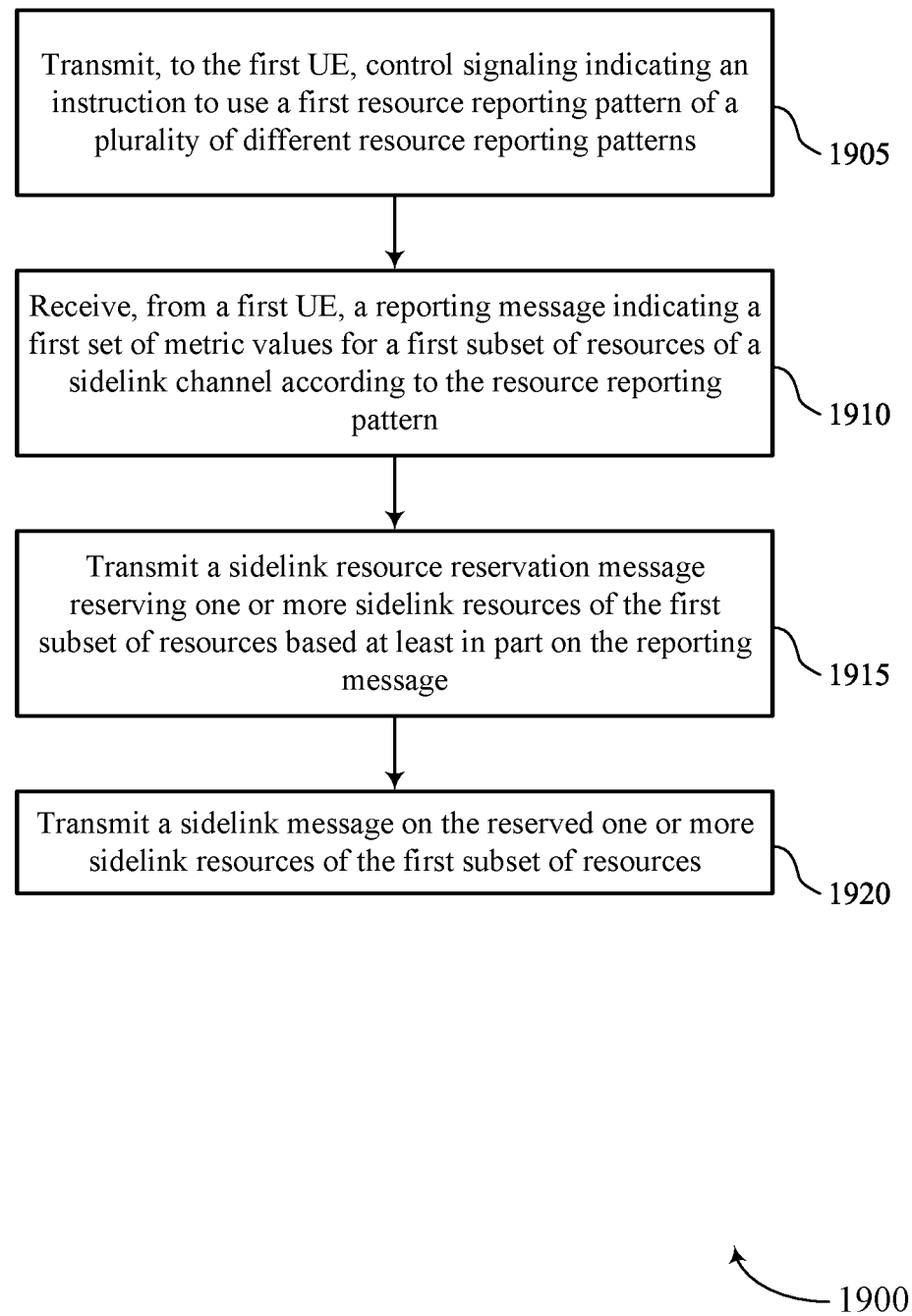

FIG. 19 shows a flowchart illustrating a method 1900 that supports payload size reduction for reporting resource sensing measurements in accordance with aspects of the present disclosure. The operations of the method 1900 may be implemented by a base station or the base station's components as described herein. For example, the operations of the method 1900 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 1905, the method may include transmitting, to the first UE, control signaling indicating an instruction to use a first resource reporting pattern of a set of multiple different resource reporting patterns. The operations of 1905 may be performed in accordance with examples as disclosed herein. In some examples, aspects of the operations of 1905 may be performed by a resource reporting pattern manager 1440 as described with reference to FIG. 14.

At 1910, the method may include receiving, from a first UE, a reporting message indicating a first set of metric values for a first subset of resources of a sidelink channel according to the resource reporting pattern. The operations of 1910 may be performed in accordance with examples as disclosed herein. In some examples, aspects of the operations of 1910 may be performed by a reporting message manager 1425 as described with reference to FIG. 14.

At 1915, the method may include transmitting a sidelink resource reservation message reserving one or more sidelink resources of the first subset of resources based on the reporting message. The operations of 1915 may be performed in accordance with examples as disclosed herein. In some examples, aspects of the operations of 1915 may be performed by a reservation message manager 1430 as described with reference to FIG. 14.

At 1920, the method may include transmitting a sidelink message on the reserved one or more sidelink resources of the first subset of resources. The operations of 1920 may be performed in accordance with examples as disclosed herein.

In some examples, aspects of the operations of 1920 may be performed by a sidelink message manager 1435 as described with reference to FIG. 14.

The following provides an overview of aspects of the present disclosure:

Aspect 1: A method for wireless communications at a first UE, comprising: measuring a first subset of resources of a sidelink channel to generate a plurality of channel quality measurements of the sidelink channel; and transmitting, to at least a second UE and based at least in part on a resource reporting pattern, a reporting message indicating a first set of metric values for the first subset of resources of the sidelink channel based at least in part on the plurality of channel quality measurements, wherein the resource reporting pattern indicates metric value reporting for the first subset of resources is different than for a second subset of resources of the sidelink channel.

Aspect 2: The method of aspect 1, wherein the resource reporting pattern indicates a first resolution is used to report each of the first set of metric values and a second resolution is used to report each of a second set of metric values for the second subset of resources.

Aspect 3: The method of any of aspects 1 through 2, wherein the resource reporting pattern indicates that metric values for the second subset of resources are not to be reported in the reporting message.

Aspect 4: The method of aspect 3, wherein each resource reporting pattern of a set of resource reporting patterns indicates a set of quantization levels.

Aspect 5: The method of any of aspects 1 through 4, wherein each metric value, of the first set of metric values, represents at least one of a channel quality metric, whether a resource of the sidelink channel is available, or a level of availability of a resource of the sidelink channel.

Aspect 6: The method of any of aspects 1 through 5, further comprising: receiving, from a base station or another UE, control signaling indicating to use the resource reporting pattern.

Aspect 7: The method of any of aspects 1 through 6, further comprising: receiving, from a base station or another UE, control signaling comprising an indication of a set of resource reporting patterns; and selecting, the resource reporting pattern from the set of resource reporting patterns.

Aspect 8: The method of any of aspects 1 through 7, wherein transmitting the reporting message includes transmitting the reporting message comprising a second set of metric values for the second subset of resources, each of the first set of metric values indicated in the reporting message has a first number of bits that is greater than a second number of bits used to report each of the second set of metric values.

Aspect 9: The method of any of aspects 1 through 8, further comprising at least one of: transmitting the reporting message indicating the resource reporting message; or transmitting, to the second UE, the reporting message or a control message indicating the resource reporting pattern.

Aspect 10: The method of aspect 9, wherein the reporting message comprises a sidelink control information message.

Aspect 11: The method of any of aspects 1 through 10, wherein transmitting the reporting message comprises: transmitting the reporting message comprising a second set of metric values for the second subset of resources, wherein each of the first set of metric values is selected from a first number of quantization levels that is greater than a second number of quantization levels for each of the second set of metric values.

Aspect 12: The method of any of aspects 1 through 11, further comprising: quantizing a first channel quality measurement of the plurality of channel quality measurements to a first quantization level of a plurality of quantization levels for a first resource of the first subset of resources, wherein the reporting message indicates the first quantization level for the first resource.

Aspect 13: The method of any of aspects 1 through 12, further comprising: refraining from measuring, for a sensing window, the second subset of resources of the sidelink channel that differs from the first subset of resources.

Aspect 14: A method for wireless communications at a second UE, comprising: receiving, from a first UE, a reporting message indicating a first set of metric values for a first subset of resources of a sidelink channel according to a resource reporting pattern; transmitting a sidelink resource reservation message reserving one or more sidelink resources of the first subset of resources based at least in part on the reporting message; and transmitting a sidelink message on the reserved one or more sidelink resources of the first subset of resources.

Aspect 15: The method of aspect 14, further comprising: transmitting, to the first UE, control signaling indicating an instruction to use the resource reporting pattern of a plurality of different resource reporting patterns.

Aspect 16: The method of any of aspects 14 through 15, further comprising: receiving, from a base station or another UE, control signaling comprising an indication of a set of resource reporting patterns comprising the resource reporting pattern.

Aspect 17: The method of any of aspects 14 through 16, wherein receiving the reporting message comprises: receiving the reporting message comprising a second set of metric values for a second subset of resources of the sidelink channel according to the resource reporting pattern, wherein each of the first set of metric values is selected from a first number of quantization levels that is greater than a second number of quantization levels for each of the second set of metric values.

Aspect 18: The method of any of aspects 14 through 17, further comprising: receiving, from the first UE, control signaling comprising an indication of the resource reporting pattern.

Aspect 19: The method of aspect 18, wherein the control signaling comprises a sidelink control information message.

Aspect 20: The method of any of aspects 14 through 19, wherein the resource reporting pattern comprises an indication of a set of quantization levels.

Aspect 21: The method of any of aspects 14 through 20, further comprising: receiving, from a third UE, a second reporting message indicating a second set of metric values for a second subset of resources of the sidelink channel according to a second resource reporting pattern; determining a metric value for one or more sidelink resource of the sidelink channel based at least in part on the first set of metric values and the second set of metric values, wherein transmitting the sidelink resource reservation message is based at least in part on the determining.

Aspect 22: The method of aspect 21, wherein determining the metric value is based at least in part on performing an auto correlation procedure, a cross-correlation procedure, or both, based at least in part on the first set of metric values and the second set of metric values.

Aspect 23: The method of any of aspects 14 through 22, wherein the resource reporting pattern indicates a first resolution is used to report each of the first set of metric values and a second resolution is used to report each of a second set of metric values for a second subset of resources.

Aspect 24: The method of any of aspects 14 through 23, wherein the resource reporting pattern indicates that metric values for a second subset of resources are not to be reported in the reporting message.

Aspect 25: The method of any of aspects 14 through 24, wherein each metric value, of the first set of metric values, represents at least one of a channel quality metric, whether a resource of the sidelink channel is available, or a level of availability of a resource of the sidelink channel.

Aspect 26: An apparatus for wireless communications at a first UE, comprising a processor; memory coupled with the processor; and instructions stored in the memory and executable by the processor to cause the apparatus to perform a method of any of aspects 1 through 13.

Aspect 27: An apparatus for wireless communications at a first UE, comprising at least one means for performing a method of any of aspects 1 through 13.

Aspect 28: A non-transitory computer-readable medium storing code for wireless communications at a first UE, the code comprising instructions executable by a processor to perform a method of any of aspects 1 through 13.

Aspect 29: An apparatus for wireless communications at a second UE, comprising a processor; memory coupled with the processor; and instructions stored in the memory and executable by the processor to cause the apparatus to perform a method of any of aspects 14 through 25.

Aspect 30: An apparatus for wireless communications at a second UE, comprising at least one means for performing a method of any of aspects 14 through 25.

Aspect 31: A non-transitory computer-readable medium storing code for wireless communications at a second UE, the code comprising instructions executable by a processor to perform a method of any of aspects 14 through 25.)

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   one or more processors;
   one or more memories coupled with the one or more processors; and
   instructions stored in the one or more memories and executable by the one or more processors to cause the apparatus to:
   measure a first subset of resources of a sidelink channel to generate a plurality of channel quality measurements of the sidelink channel; and
   transmit, to at least a second UE and based at least in part on a resource reporting pattern, a reporting message indicating the resource reporting pattern and indicating a first set of metric values for the first subset of resources of the sidelink channel based at least in part on the plurality of channel quality measurements,
   wherein the resource reporting pattern indicates metric value reporting for the first subset of resources is different than for a second subset of resources of the sidelink channel, the resource reporting pattern further indicating resources comprising the first subset of resources and the second subset of resources.

2. The apparatus of claim 1, wherein the resource reporting pattern indicates a first resolution is used to report each of the first set of metric values and a second resolution is used to report each of a second set of metric values for the second subset of resources.

3. The apparatus of claim 1, wherein the resource reporting pattern indicates that metric values for the second subset of resources are not to be reported in the reporting message.

4. The apparatus of claim 3, wherein each resource reporting pattern of a set of resource reporting patterns indicates a set of quantization levels.

5. The apparatus of claim 1, wherein each metric value, of the first set of metric values, represents at least one of a channel quality metric, whether a resource of the sidelink channel is available, or a level of availability of a resource of the sidelink channel.

6. The apparatus of claim 1, wherein the instructions are further executable by the one or more processors to cause the apparatus to:
receive, from a base station or another UE, control signaling indicating to use the resource reporting pattern.

7. The apparatus of claim 1, wherein the instructions are further executable by the one or more processors to cause the apparatus to:
receive, from a base station or another UE, control signaling comprising an indication of a set of resource reporting patterns; and
select, the resource reporting pattern from the set of resource reporting patterns.

8. The apparatus of claim 1, wherein the reporting message includes a second set of metric values for the second subset of resources,
each of the first set of metric values indicated in the reporting message has a first number of bits that is greater than a second number of bits used to report each of the second set of metric values.

9. The apparatus of claim 1, wherein the reporting message comprises a sidelink control information message.

10. The apparatus of claim 1, wherein the instructions to transmit the reporting message are executable by the one or more processors to cause the apparatus to:
transmit the reporting message comprising a second set of metric values for the second subset of resources,
wherein each of the first set of metric values is selected from a first number of quantization levels that is greater than a second number of quantization levels for each of the second set of metric values.

11. The apparatus of claim 1, wherein the instructions are further executable by the one or more processors to cause the apparatus to:
quantize a first channel quality measurement of the plurality of channel quality measurements to a first quantization level of a plurality of quantization levels for a first resource of the first subset of resources,
wherein the reporting message indicates the first quantization level for the first resource.

12. The apparatus of claim 1, wherein the instructions are further executable by the one or more processors to cause the apparatus to:
refrain from measuring, for a sensing window, the second subset of resources of the sidelink channel that differs from the first subset of resources.

13. An apparatus for wireless communications at a second user equipment (UE), comprising:
one or more processors;
one or more memories coupled with the one or more processors; and
instructions stored in the one or more memories and executable by the one or more processors to cause the apparatus to:
receive, from a first UE and according to a resource reporting pattern, a reporting message indicating the resource reporting pattern and indicating a first set of metric values for a first subset of resources of a sidelink channel, the resource reporting pattern indicating resources comprising the first subset of resources and a second subset of resources;
transmit a sidelink resource reservation message reserving one or more sidelink resources of the first subset of resources based at least in part on the reporting message; and
transmit a sidelink message on the reserved one or more sidelink resources of the first subset of resources.

14. The apparatus of claim 13, wherein the instructions are further executable by the one or more processors to cause the apparatus to:
transmit, to the first UE, control signaling indicating an instruction to use the resource reporting pattern of a plurality of different resource reporting patterns.

15. The apparatus of claim 13, wherein the instructions are further executable by the one or more processors to cause the apparatus to:
receive, from a base station or another UE, control signaling comprising an indication of a set of resource reporting patterns comprising the resource reporting pattern.

16. The apparatus of claim 13, wherein the instructions to receive the reporting message are executable by the one or more processors to cause the apparatus to:
receive the reporting message comprising a second set of metric values for the second subset of resources of the sidelink channel according to the resource reporting pattern,
wherein each of the first set of metric values is selected from a first number of quantization levels that is greater than a second number of quantization levels for each of the second set of metric values.

17. The apparatus of claim 13, wherein the reporting message comprises a sidelink control information message.

18. The apparatus of claim 13, wherein the resource reporting pattern comprises an indication of a set of quantization levels.

19. The apparatus of claim 13, wherein the instructions are further executable by the one or more processors to cause the apparatus to:
receive, from a third UE, a second reporting message indicating a second set of metric values for the second subset of resources of the sidelink channel according to a second resource reporting pattern; and
determine a metric value for one or more sidelink resource of the sidelink channel based at least in part on the first set of metric values and the second set of metric values,
wherein the sidelink resource reservation message is based at least in part on the metric value.

20. The apparatus of claim 19, wherein the instructions to determine the metric value for the one or more sidelink resource of the sidelink channel are executable by the one or more processors to cause the apparatus to perform an auto correlation procedure, a cross-correlation procedure, or both, based at least in part on the first set of metric values and the second set of metric values.

21. The apparatus of claim 13, wherein the resource reporting pattern indicates a first resolution is used to report each of the first set of metric values and a second resolution is used to report each of a second set of metric values for the second subset of resources.

22. The apparatus of claim 13, wherein the resource reporting pattern indicates that metric values for the second subset of resources are not to be reported in the reporting message.

23. The apparatus of claim 13, wherein each metric value, of the first set of metric values, represents at least one of a channel quality metric, whether a resource of the sidelink channel is available, or a level of availability of a resource of the sidelink channel.

24. A method for wireless communications at a first user equipment (UE), comprising:
   measuring a first subset of resources of a sidelink channel to generate a plurality of channel quality measurements of the sidelink channel; and
   transmitting, to at least a second UE and based at least in part on a resource reporting pattern, a reporting message indicating the resource reporting pattern and indicating a first set of metric values for the first subset of resources of the sidelink channel based at least in part on the plurality of channel quality measurements,
      wherein the resource reporting pattern indicates metric value reporting for the first subset of resources is different than for a second subset of resources of the sidelink channel, the resource reporting pattern further indicating resources comprising the first subset of resources and the second subset of resources.

25. The method of claim 24, wherein the resource reporting pattern indicates a first resolution is used to report each of the first set of metric values and a second resolution is used to report each of a second set of metric values for the second subset of resources.

26. A method for wireless communications at a second user equipment (UE), comprising:
   receiving, from a first UE and according to a resource reporting pattern, a reporting message indicating the resource reporting pattern and indicating a first set of metric values for a first subset of resources of a sidelink channel, the resource reporting pattern indicating resources comprising the first subset of resources and a second subset of resources;
   transmitting a sidelink resource reservation message reserving one or more sidelink resources of the first subset of resources based at least in part on the reporting message; and
   transmitting a sidelink message on the reserved one or more sidelink resources of the first subset of resources.

27. The method of claim 26, further comprising:
   transmitting, to the first UE, control signaling indicating an instruction to use the resource reporting pattern of a plurality of different resource reporting patterns.

\* \* \* \* \*

UNITED STATES PATENT AND TRADEMARK OFFICE
CERTIFICATE OF CORRECTION

| | | |
|---|---|---|
| PATENT NO. | : 12,127,234 B2 | Page 1 of 1 |
| APPLICATION NO. | : 17/512065 | |
| DATED | : October 22, 2024 | |
| INVENTOR(S) | : Elshafie et al. | |

It is certified that error appears in the above-identified patent and that said Letters Patent is hereby corrected as shown below:

On the Title Page

Item (72), under Inventors, Inventor 2 currently listed as "Tugcan Aklas" should read "Tugcan Aktas"

Signed and Sealed this
Twenty-fourth Day of December, 2024

Derrick Brent
*Acting Director of the United States Patent and Trademark Office*